US012731259B2

(12) United States Patent
Leong et al.

(10) Patent No.: US 12,731,259 B2
(45) Date of Patent: Sep. 8, 2026

(54) GENERATING OBJECT MASK PREVIEWS AND SINGLE INPUT SELECTION OBJECT MASKS

(71) Applicant: Adobe Inc., San Jose, CA (US)

(72) Inventors: Betty Leong, Los Altos, CA (US); Hyunghwan Byun, Mountain View, CA (US); Alan L Erickson, Highlands Ranch, CO (US); Chih-Yao Hsieh, San Jose, CA (US); Sarah Kong, Cupertino, CA (US); Seyed Morteza Safdarnejad, San Jose, CA (US); Salil Tambe, San Jose, CA (US); Yilin Wang, San Jose, CA (US); Zijun Wei, San Jose, CA (US); Zhengyun Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 485 days.

(21) Appl. No.: 17/584,233

(22) Filed: Jan. 25, 2022

(65) Prior Publication Data

US 2023/0129341 A1 Apr. 27, 2023

Related U.S. Application Data

(60) Provisional application No. 63/271,147, filed on Oct. 23, 2021.

(51) Int. Cl.

*G06F 3/04842* (2022.01)
*G06T 3/4046* (2024.01)
*G06T 7/10* (2017.01)

(52) U.S. Cl.

CPC ............ *G06T 7/10* (2017.01); *G06F 3/04842* (2013.01); *G06T 3/4046* (2013.01); *G06T 2207/20084* (2013.01); *G06T 2207/20092* (2013.01)

(58) Field of Classification Search

CPC . G06T 7/10; G06T 7/11; G06T 3/4046; G06T 5/60; G06T 2207/20092; G06F 3/04842; G06F 7/764

(Continued)

(56) References Cited

U.S. PATENT DOCUMENTS

| | | |
|---|---|---|
| 5,214,744 A | 5/1993 | Schweizer et al. |
| 6,993,174 B2 | 1/2006 | Fan et al. |

(Continued)

FOREIGN PATENT DOCUMENTS

| | | |
|---|---|---|
| CN | 106022273 A | 10/2016 |
| CN | 106339591 A | 1/2017 |

(Continued)

OTHER PUBLICATIONS

He et al. in Guided Image Filtering, IEEE Transactions on Pattern Analysis and Machine Intelligence, vol. 35, 2013.

(Continued)

*Primary Examiner* — Jamares Q Washington
(74) *Attorney, Agent, or Firm* — Keller Preece PLLC

(57) ABSTRACT

The present disclosure relates to systems, methods, and non-transitory computer-readable media that generate preliminary object masks for objects in an image, surface the preliminary object masks as object mask previews, and on-demand converts preliminary object masks into refined object masks. Indeed, in one or more implementations, an object mask preview and on-demand generation system automatically detects objects in an image. For the detected objects, the object mask preview and on-demand generation system generates preliminary object masks for the detected objects of a first lower resolution. The object mask preview and on-demand generation system surfaces a given preliminary object mask in response to detecting a first input. The object mask preview and on-demand generation system also (Continued)

generates a refined object mask of a second higher resolution in response to detecting a second input.

20 Claims, 19 Drawing Sheets

(58) Field of Classification Search
USPC ................................ 382/173, 283, 190, 224
See application file for complete search history.

(56) References Cited

U.S. PATENT DOCUMENTS 7,031,519 B2 4/2006 Elmenhurst
7,295,700 B2 11/2007 Schiller et al.
7,606,417 B2 10/2009 Steinberg et al.
7,916,917 B2 3/2011 Dewaele et al.
8,600,143 B1 12/2013 Kulkarni et al.
8,675,934 B2 3/2014 Wehnes et al.
9,251,429 B2 2/2016 Pham et al.
9,336,483 B1 5/2016 Abeysooriya et al.
9,342,869 B2 5/2016 Wang et al.
9,418,319 B2 8/2016 Shen et al.
9,443,316 B1 * 9/2016 Takeda ............... G06V 30/2504
9,495,756 B2 11/2016 Rivet-Sabourin
9,684,967 B2 6/2017 Abedini et al.
10,109,051 B1 10/2018 Natesh et al.
10,192,129 B2 1/2019 Price et al.
10,210,613 B2 2/2019 Xu et al.
10,460,214 B2 10/2019 Lu et al.
10,470,510 B1 11/2019 Koh et al.
10,643,331 B2 5/2020 Ghesu et al.
10,679,046 B1 6/2020 Black et al.
10,846,566 B2 11/2020 Zhu et al.
11,282,208 B2 3/2022 Cohen et al.
11,335,004 B2 5/2022 Liu et al.
11,430,129 B2 8/2022 Barish
11,568,627 B2 1/2023 Price et al.
11,676,279 B2 6/2023 Price et al.
11,875,254 B2 1/2024 Rhodes et al.
2001/0051852 A1 12/2001 Sundaravel et al.
2003/0081833 A1 5/2003 Tilton
2004/0042662 A1 3/2004 Wilensky et al.
2004/0126013 A1 7/2004 Olson
2004/0190092 A1 9/2004 Silverbrook et al.
2004/0202368 A1 10/2004 Lee et al.
2005/0264557 A1 12/2005 Kise
2006/0013455 A1 1/2006 Watson et al.
2006/0015373 A1 1/2006 Cuypers
2006/0045336 A1 3/2006 Lim
2006/0285743 A1 12/2006 Oh et al.
2007/0165949 A1 7/2007 Sinop et al.
2009/0003699 A1 1/2009 Dugan et al.
2009/0252429 A1 10/2009 Prochazka et al.
2010/0183225 A1 7/2010 Vantaram et al.
2010/0226566 A1 9/2010 Luo et al.
2010/0322488 A1 12/2010 Virtue et al.
2011/0188720 A1 8/2011 Narayanan et al.
2011/0216975 A1 9/2011 Rother et al.
2011/0285874 A1 11/2011 Showering et al.
2012/0201423 A1 8/2012 Onai et al.
2013/0182909 A1 7/2013 Rodriguez-Serrano
2013/0223740 A1 8/2013 Wang et al.
2013/0259374 A1 10/2013 He et al.
2014/0007022 A1 * 1/2014 Tocino Diaz .......... G06V 40/28
715/863
2014/0010449 A1 1/2014 Haaramo et al.
2014/0056472 A1 2/2014 Gu
2014/0056520 A1 2/2014 Rodriguez Serrano
2014/0247978 A1 9/2014 Devin et al.
2014/0334667 A1 11/2014 Eswara et al.
2015/0117783 A1 4/2015 Lin et al.
2015/0170002 A1 6/2015 Szegedy et al.
2015/0269427 A1 9/2015 Kim et al.
2016/0189010 A1 6/2016 Tang et al.
2016/0232425 A1 8/2016 Huang et al.
2016/0358035 A1 12/2016 Ruan et al.
2017/0032551 A1 2/2017 Fried et al.
2017/0039723 A1 2/2017 Price et al.
2017/0068416 A1 * 3/2017 Li ....................... G06F 3/04842
2017/0076443 A1 3/2017 Ye et al.
2017/0103258 A1 4/2017 Yu et al.
2017/0109625 A1 4/2017 Dai et al.
2017/0116497 A1 4/2017 Georgescu et al.
2017/0140236 A1 5/2017 Price et al.
2017/0169313 A1 6/2017 Choi et al.
2017/0169567 A1 6/2017 Chefd'hotel et al.
2017/0213112 A1 7/2017 Sachs et al.
2017/0213349 A1 7/2017 Kuo et al.
2017/0231550 A1 8/2017 Do et al.
2017/0244908 A1 8/2017 Flack et al.
2017/0249739 A1 8/2017 Kallenberg et al.
2017/0287137 A1 10/2017 Lin et al.
2018/0061046 A1 3/2018 Bozorgtabar et al.
2018/0108137 A1 4/2018 Price et al.
2018/0137335 A1 5/2018 Kim et al.
2018/0182101 A1 6/2018 Petersen et al.
2018/0240243 A1 8/2018 Kim et al.
2018/0293707 A1 * 10/2018 El-Khamy ............ G06T 3/4069
2018/0307946 A1 10/2018 Kuroda et al.
2018/0365813 A1 * 12/2018 Leong ...................... G06T 7/11
2019/0057507 A1 2/2019 El-Khamy et al.
2019/0080456 A1 3/2019 Song et al.
2019/0108414 A1 4/2019 Price et al.
2019/0130229 A1 5/2019 Lu et al.
2019/0205606 A1 7/2019 Zhou et al.
2019/0236394 A1 8/2019 Price et al.
2019/0236786 A1 * 8/2019 McNerney ............. G06F 18/22
2019/0340462 A1 11/2019 Pao et al.
2019/0357615 A1 11/2019 Koh et al.
2019/0377487 A1 * 12/2019 Bailey ..................... G06F 1/163
2020/0020108 A1 * 1/2020 Pao .......................... G06T 7/90
2020/0143194 A1 5/2020 Hou et al.
2020/0167930 A1 5/2020 Wang et al.
2020/0218961 A1 * 7/2020 Kanazawa ............... H04Q 9/00
2020/0302173 A1 * 9/2020 Deng ...................... G06T 7/194
2020/0320273 A1 10/2020 Li
2020/0388071 A1 12/2020 Grabner et al.
2021/0027098 A1 1/2021 Ge et al.
2021/0082118 A1 3/2021 Zhang et al.
2021/0158043 A1 * 5/2021 Hou ..................... G06V 10/454
2021/0217178 A1 7/2021 Terzopoulos et al.
2021/0248748 A1 8/2021 Turgutlu et al.
2021/0290096 A1 9/2021 Yang
2021/0295507 A1 9/2021 Nie
2022/0044366 A1 2/2022 Zhang et al.
2022/0044407 A1 2/2022 Liu et al.
2022/0108454 A1 4/2022 Tsai et al.
2022/0237799 A1 7/2022 Price et al.
2022/0262009 A1 8/2022 Yu et al.
2022/0292684 A1 9/2022 Wang et al.
2022/0375079 A1 11/2022 Finley et al.
2023/0281763 A1 9/2023 Zhang et al.

FOREIGN PATENT DOCUMENTS

CN 107103315 A 8/2017
CN 108345890 A 7/2018
CN 110232689 A 9/2019
DE 102015207047 A1 10/2015
WO 2015/177268 A1 11/2015
WO 2018/229490 A1 12/2018

OTHER PUBLICATIONS

He et al. in Fast Guided Filter, Computer Vision and Pattern Recognition, arXiv:1505.00996, 2015.

Ning Xu et al., "Deep GrabCut for Object Selection," published Jul. 14, 2017.

Zhao et al., in Pyramid scene parsing network, In Proceedings of the IEEE conference on computer vision and pattern recognition, pp. 2881-2890, 2017.

(56) References Cited

OTHER PUBLICATIONS

He et al. in Deep Residual Learning For Image Recognition In Proceedings of the IEEE conference on computer vision and pattern recognition, pp. 770-778, 2016.
Howard et al., in Searching For Mobilenetv3, In Proceedings of the IEEE International Conference on Computer Vision, pp. 1314-1324, 2019.
A. Criminisi, T. Sharp, and A. Blake. GeoS: Geodesic image segmentation. In ECCV, pp. 99-112, 2008.
A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
Alex Krizhevsky, Ilya Sutskever, and Geoffrey E Hinton. Imagenet classification with deep convolutional neural networks. In Advances in neural information processing systems, pp. 1097-1105, 2012.
Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Ali Borji and Laurent Itti. State-of-the-art in visual attention modeling. IEEE transactions on pattern analysis and machine intelligence, 35(1):185-207, 2012.
Ali Borji, Ming-Ming Cheng, Qibin Hou, Huaizu Jiang, and Jia Li. Salient object detection: A survey. Computational visual media, pp. 1-34, 2019.
B. Hariharan, P. Arbelaez, L. Bourdev, S. Maji, and J. Malik. Semantic contours from inverse detectors. 2011.
B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
C. Rother, V. Kolmogorov, and A. Blake. Grabcut: Interactive foreground extraction using iterated graph cuts. ACM Transactions on Graphics (TOG), 23(3):309-314, 2004.
Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.
Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).
Chen, Liang-Chieh et al. "Rethinking Atrous Convolution for Semantic Image Segmentation." ArXiv abs/1706.05587 (2017): n. pag.
Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Combined Search & Examination Report as received in UK application GB1813276.1 dated Feb. 14, 2019.
Combined Search and Examination Report as received in UK application GB1915436.8 dated Aug. 12, 2020.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
D. Freedman and T. Zhang. Interactive graph cut based segmentation with shape priors. In IEEE CVPR, vol. 1, pp. 755-762. IEEE, 2005.
Dominik A Klein and Simone Frintrop. Center-surround divergence of feature statistics for salient object detection. In 2011 International Conference on Computer Vision, pp. 2214-2219. IEEE, 2011.
E. N. Mortensen and W. A. Barrett. Intelligent scissors for image composition. In Proceedings of the 22nd annual conference on Computer graphics and interactive techniques, pp. 191-198, 1995.
Examination Report as received in Australian application 2019250107 dated Nov. 5, 2021.
Examination Report as received in Australian application 2019250107 dated Oct. 14, 2021.
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.
G. Lin, C. Shen, I. Reid, et al. Efficient piecewise training of deep structured models for semantic segmentation. arXiv preprint arXiv:1504.01013, 2015.
Gao Huang, Zhuang Liu, Kilian Q. Weinberger, and Laurens V.D. Maaten; "Densely connected convolutional networks," In arXiv:1608.06993v3, 2016.
Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.
Guanbin Li and Yizhou Yu. Visual saliency based on multi-scale deep features. In Proceedings of the IEEE conference on computer vision and pattern recognition, pp. 5455-5463, 2015.
Guo, Z.—"Medical Image Segmentation Based on Multi-Modal Convolutional Neural Network: Study on Image Fusion Schemes"—arXiv—Nov. 2, 2017—pp. 1-10 (Year: 2017).
Guo, Z.—"Deep Learning-Based Image Segmentation on Multimodal Medical Imaging"—IEEE—Mar. 1, 2019—pp. 162-169 ( Year: 2019).
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
H. Le, L. Mai, B. Price, S. Cohen, H. Jin, and F. Liu. Interactive boundary prediction for object selection. In ECCV, Sep. 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
IEEE Conference On Computer Vision and Pattern Recognition (CVPR), 2016, Liang Chieh Chen et al., "Attention to Scale: Scale-Aware Semantic Image Segmentation", pp. 3640-3649 abstract 1. 7-9 and p. 2 left column 1st paragraph starting at "In particular . . . ", 1. 4-7, Sec. 3.1, Fig. 5 col. (c).
IEEE/CVF International Conference On Computer Vision (ICCV), 2019, Liew Jun Hao et al, "MultiSeg: Semantically Meaningful, Scale-Diverse Segmentations From Minimal User Input", pp. 662-670 the whole document.
Intention to Grant as received in UK application GB1915436.8 dated Aug. 25, 2021.

(56) References Cited

OTHER PUBLICATIONS

J. H. Liew, Y. Wei, W. Xiong, S.-H. Ong, and J. Feng. Regional interactive image segmentation networks. In IEEE ICCV, Oct. 2017.
J. Long, E. Shelhamer, and T. Darrell. Fully convolutional networks for semantic segmentation. arXiv preprint arXiv:1411.4038, 2014.
J. Redmon, S. Divvala, R. Girshick, and A. Farhadi. You only look once: Unified, real-time object detection. In Proceedings of the IEEE conference on computer vision and pattern recognition, pp. 779-788, 2016.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Jianming Zhang and Stan Sclaroff. Saliency detection: A boolean map approach. In Proceedings of the IEEE international conference on computer vision, pp. 153-160, 2013.
Jianping Shi, Qiong Yan, Li Xu, and Jiaya Jia. Hierarchical image saliency detection on extended cssd. IEEE transactions on pattern analysis and machine intelligence, 38(4):717-729, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Kamat, S. P.; Control Theory and Informatics, vol. 2, No. 1, 2012 Digital Image Processing for Camera Application in Mobile Devices using Artificial Neural Networks, pp. 11-17.
Karen Simonyan and Andrew Zisserman. Very deep convolutional networks for large-scale image recognition. arXiv preprint arXiv:1409.1556, 2014.
L. Castrejon, K. Kundu, R. Urtasun, and S. Fidler. Annotating object instances with a polygon-rnn. In IEEE CVPR, Jul. 2017.
L. Grady. Random walks for image segmentation. Pattern Analysis and Machine Intelligence, IEEE Transactions on, 28(11):1768-1783, 2006. Part 1.
L. Grady. Random walks for image segmentation. Pattern Analysis and Machine Intelligence, IEEE Transactions on, 28(11):1768-1783, 2006. Part 2.
L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
Laurent Itti, Christof Koch, and Ernst Niebur. A model of saliency-based visual attention for rapid scene analysis. IEEE Transactions on pattern analysis and machine intelligence, 20(11):1254-1259, 1998.
Le, T., & Duan, Y. (2020). REDN: a recursive encoder-decoder network for edge detection. IEEE Access, 8, 90153-90164. (Year: 2020).
Li et al., Interactive Image Segmentation with Latent Diversity, 2018, IEEE 2575-7075/18, DOI 10.11/09/CVPR. 2018.00067, pp. 577-585. (Year: 2018).
Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
M. Kass, A. Witkin, and D. Terzopoulos. Snakes: Active contour models. IJCV, 1(4):321-331, 1988.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
N. Xu, B. Price, S. Cohen, J. Yang, and T. S. Huang. Deep interactive object selection. In IEEE CVPR, pp. 373-381, Mar. 13, 2016.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Ning Xu, Brian Price, Scott Cohen, and Thomas Huang. Deep image matting. In Proceedings of the IEEE Conference on Computer Vision and Pattern Recognition, pp. 2970-2979, 2017.
Notice of Grant as received in Australian application 2019250107 dated Mar. 17, 2022.
Notice of Grant as received in UK application GB1813276.1 dated Oct. 12, 2021.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
Office Action as received in CN application 201810886944.1 dated Apr. 8, 2023.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Philipp Krahenbuhl and Vladlen Koltun. Efficient inference in fully connected crfs with gaussian edge potentials. In Advances in neural information processing systems, pp. 109-117, 2011.

(56) References Cited

OTHER PUBLICATIONS

Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.
Robert Osserman et al. The isoperimetric inequality. Bulletin of the American Mathematical Society, 84(6):1182-1238, 1978.
Roth, H.—"DeepOrgan: Multi-level Deep Convolutional Networks for Automated Pancreas Segmentation"—Jun. 22, 2015—arXiv:1506.06448v1, pp. 1-12.
Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
S. Mahadevan, P. Voigtlaender, and B. Leibe. Iteratively trained interactive segmentation. arXiv preprint arXiv:1805.04398, 2018.
S. Ren, K. He, R. Girshick, and J. Sun. Faster r-cnn: Towards real-time object detection with region proposal networks. In Advances in neural information processing systems, pp. 91-99, 2015.
S. Vicente, V. Kolmogorov, and C. Rother. Graph cut based image segmentation with connectivity priors. In IEEE CVPR, pp. 1-8. IEEE, 2008.
S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.
Wang, G.—"Interactive Medical Image Segmentation using Deep Learning with Image-specific Fine-tuning"—arXiv—Oct. 11, 2017—pp. 1-11 (Year: 2017).
Wang, N.—"Transferring Rich Feature Hierarchies for Robust Visual Tracking"—Apr. 23, 2015—arXiv:1501.04587v2, pp. 1-9.
Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
X. Bai and G. Sapiro. Geodesic matting: A framework for fast interactive image and video segmentation and matting. International Journal of Computer Vision, 82(2):113-132, 2008.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Xu et al., Deep Interactive Object Selection, Mar. 13, 2016 arXiv:1603.04042v1 [cs.CV], pp. 1-9. (Year: 2016).
Y. Hu, A. Soltoggio, R. Lock, and S. Carter. A fully convolutional two-stream fusion network for interactive image segmentation. Neural Networks, 109:31-42, 2019.
Y. Li, J. Sun, C.-K. Tang, and H.-Y. Shum. Lazy snapping. In ACM Transactions on Graphics, vol. 23, pp. 303-308, 2004.
Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.
Yang et al., Meticulous Object Segmentation, Dec. 13, 2020, available at https://arxiv.org/pdf/2012.07181.pdf.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Yichen Wei, Fang Wen, Wangjiang Zhu, and Jian Sun. Geodesic saliency using background priors. In European conference on computer vision, pp. 29-42. Springer, 2012.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Z. Li, Q. Chen, and V. Koltun. Interactive image segmentation with latent diversity. In IEEE CVPR, pp. 577-585, 2018.
Z. Liu, X. Li, P. Luo, C. C. Loy, and X. Tang. Semantic image segmentation via deep parsing network. arXiv preprint arXiv:1509.02634, 2015.
Zhang et al. in U.S. Appl. No. 16/988,055, filed Aug. 7, 2020, entitled Generating an Image Mask for a Digital Image by Utilizing a Multi-Branch Masking Pipeline With Neural Networks.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
U.S. Appl. No. 14/945,245, Sep. 21, 2017, Preinterview 1st Office Action.
U.S. Appl. No. 14/945,245, Nov. 1, 2017, 1st Action Office Action.
U.S. Appl. No. 14/945,245, Apr. 17, 2018, Office Action.
U.S. Appl. No. 14/945,245, Sep. 12, 2018, Notice of Allowance.
U.S. Appl. No. 16/216,739, Feb. 25, 2021, Preinterview 1st Office Action.
U.S. Appl. No. 16/216,739, Apr. 5, 2021, 1st Action Office Action.
U.S. Appl. No. 16/216,739, Sep. 13, 2021, Office Action.
U.S. Appl. No. 16/216,739, Dec. 23, 2021, Notice of Allowance.
U.S. Appl. No. 15/799,395, Mar. 14, 2019, Office Action.
U.S. Appl. No. 15/799,395, Jul. 12, 2019, Notice of Allowance.
U.S. Appl. No. 15/967,928, Dec. 10, 2020, Preinterview 1st Office Action.
U.S. Appl. No. 15/967,928, Apr. 2, 2021, 1st Action Office Action.
U.S. Appl. No. 15/967,928, May 13, 2021, Office Action.
U.S. Appl. No. 15/967,928, Sep. 29, 2021, Notice of Allowance.
U.S. Appl. No. 16/231,746, Feb. 18, 2021, Preinterview 1st Office Action.
U.S. Appl. No. 16/231,746, Jun. 11, 2021, 1st Action Office Action.
U.S. Appl. No. 16/231,746, Nov. 10, 2021, Notice of Allowance.

(56) References Cited

OTHER PUBLICATIONS

U.S. Appl. No. 16/988,408, Oct. 5, 2021, Preinterview 1st Office Action.
U.S. Appl. No. 16/988,408, Nov. 24, 2021, 1st Action Office Action.
U.S. Appl. No. 16/988,408, Jan. 5, 2022, Notice of Allowance.
U.S. Appl. No. 16/376,704, Dec. 29, 2021, Preinterview 1st Office Action.
U.S. Appl. No. 16/376,704, Feb. 7, 2022, 1st Action Office Action.
U.S. Appl. No. 16/376,704, Jun. 14, 2022, Office Action.
U.S. Appl. No. 16/376,704, Oct. 4, 2022, Notice of Allowance.
U.S. Appl. No. 17/126,986, Aug. 30, 2022, Office Action.
U.S. Appl. No. 17/126,986, Jan. 17, 2023, Notice of Allowance.
U.S. Appl. No. 17/660,361, Dec. 8, 2022, Office Action.
U.S. Appl. No. 17/660,361, Mar. 28, 2023, Notice of Allowance.
U.S. Appl. No. 17/200,525, Mar. 6, 2023, Office Action.
Office Action as received in CN application 201810886944.1 dated Dec. 29, 2023.
Zhang, Y., Li, X., Lin, M., Chiu, B., & Zhao, M. (2020). Deep-recursive residual network for image semantic segmentation. Neural computing and applications, 32, 12935-12947.
U.S. Appl. No. 17/200,525, Sep. 5, 2023, Notice of Allowance.
Office Action as received in CN application 201910967936.4 dated Jun. 5, 2024.
Chang, Yong et al. "Accurate pelvis and femur segmentation in hip CT with a novel patch-based refinement." IEEE journal of biomedical and health informatics 23.3 (2018): 1192-1204. (Year: 2018).
Costea, Arthur Daniel, Andra Petrovai, and Sergiu Nedevschi. "Fusion scheme for semantic and instance-level segmentation." 2018 21st International Conference on Intelligent Transportation Systems (ITSC). IEEE, 2018. (Year: 2018).
Zhou, Peng, et al. "Deepstrip: High-resolution boundary refinement. " Proceedings of the IEEE/CVF conference on computer vision and pattern recognition. 2020. (Year: 2020).
U.S. App. No. 17/585,140, Mar. 27, 2024, Notice of Allowance.
U.S. Appl. No. 17/655,493, Nov. 4, 2024, Notice of Allowance.
U.S. Appl. No. 17/655,493, Jul. 18, 2024, Office Action.
U.S. Appl. No. 17/584,170, May 15, 2025, Office Action.
U.S. Appl. No. 18/161,666, Sep. 24, 2025, Office Action.
U.S. Appl. No. 17/584,170, Aug. 27, 2025, Office Action.
U.S. Appl. No. 17/584,170, Oct. 21, 2025, Office Action.
U.S. Appl. No. 18/161,666, Jan. 6, 2026, Notice of Allowance.
U.S. Appl. No. 17/584,170, Dec. 29, 2025, Notice of Allowance.

* cited by examiner

GENERATING OBJECT MASK PREVIEWS AND SINGLE INPUT SELECTION OBJECT MASKS

CROSS REFERENCE TO RELATED APPLICATIONS

This application claims the benefit of and priority to U.S. Provisional Patent Application No. 63/271,147, filed Oct. 23, 2021, which is incorporated herein by reference in its entirety.

BACKGROUND

Recent years have seen a significant increase in digital image editing. Indeed, advances in both hardware and software have increased the ability of individuals to capture, create, and edit digital images. For instance, the hardware on most modern computing devices (e.g., smartphones, tablets, servers, desktops, and laptops) enables both professionals and hobbyists to perform a variety of digital image editing operations. Similarly, improvements in software enable individuals to modify, filter, or otherwise edit digital images across a variety of computing devices.

Notwithstanding these improvements, conventional systems continue to suffer from several problems with respect to object selection. For instance, when segmenting objects within images, many conventional systems require excessive computing resources, and thus, cannot run on some computing devices. Along related lines, such conventional systems also require relatively long processing times due to time associated with sending a request to a server to perform the segmentation task, the time required by the server to perform the task, and time required to receive and render the selected object. As such, conventional systems typically do not allow for real-time like responses in response to object selection requests.

Along related lines, a user may request the selection of an object only to receive an undesirable segmentation in response to the request due to inaccurate or otherwise non-optimal user indication of the object to be selected. In such cases, conventional systems require the user to wait for the relatively long processing time required to perform the task before discovering the issue. Furthermore, the user then needs to provide an updated indication of the object to be selected and re-request the selection task to be run again. To obtain a desirable object selection, this back and forth process with associated lag times can result in a frustrating user experience.

Furthermore, many conventional systems require extensive user input to accurately determine boundaries of objects to be selected. For example, some systems require that a user provide a relatively accurate outline of the object boundaries in order to receive an accurate object mask. Even state of the art systems require the user to provide at least a rough boundary (e.g., a bounding box) around the object in order to generate an object mask. Such input typically requires selection of one or more tools and numerous user inputs. Providing such input is time consuming and is often difficult and tedious when working on devices with smaller screens (e.g., a smart phone or tablet). In these and other use cases, conventional systems waste both time and valuable computing resources.

BRIEF SUMMARY

One or more implementations described herein provide benefits and/or solve one or more problems in the art with systems, methods, and non-transitory computer-readable media that generate low-resolution object masks for objects in an image, surface the low-resolution object masks as object mask previews, and on-demand converts low-resolution object masks into high-resolution object masks. Indeed, in one or more implementations, an object mask preview and on-demand generation system automatically detects objects in an image, generates low-resolution object masks for the detected objects, surfaces a given low-resolution object mask in response to detecting a first input (e.g., hover of a cursor over a corresponding object), and generates a high-resolution object mask in response to detecting a second input (e.g., a click or tap on a corresponding low-resolution object mask).

The following description sets forth additional features and advantages of one or more implementations of the disclosed systems, computer-readable media, and methods.

BRIEF DESCRIPTION OF THE DRAWINGS

This disclosure will describe one or more implementations of the invention with additional specificity and detail by referencing the accompanying figures. The following paragraphs briefly describe those figures, in which.

DETAILED DESCRIPTION

Figure 1:
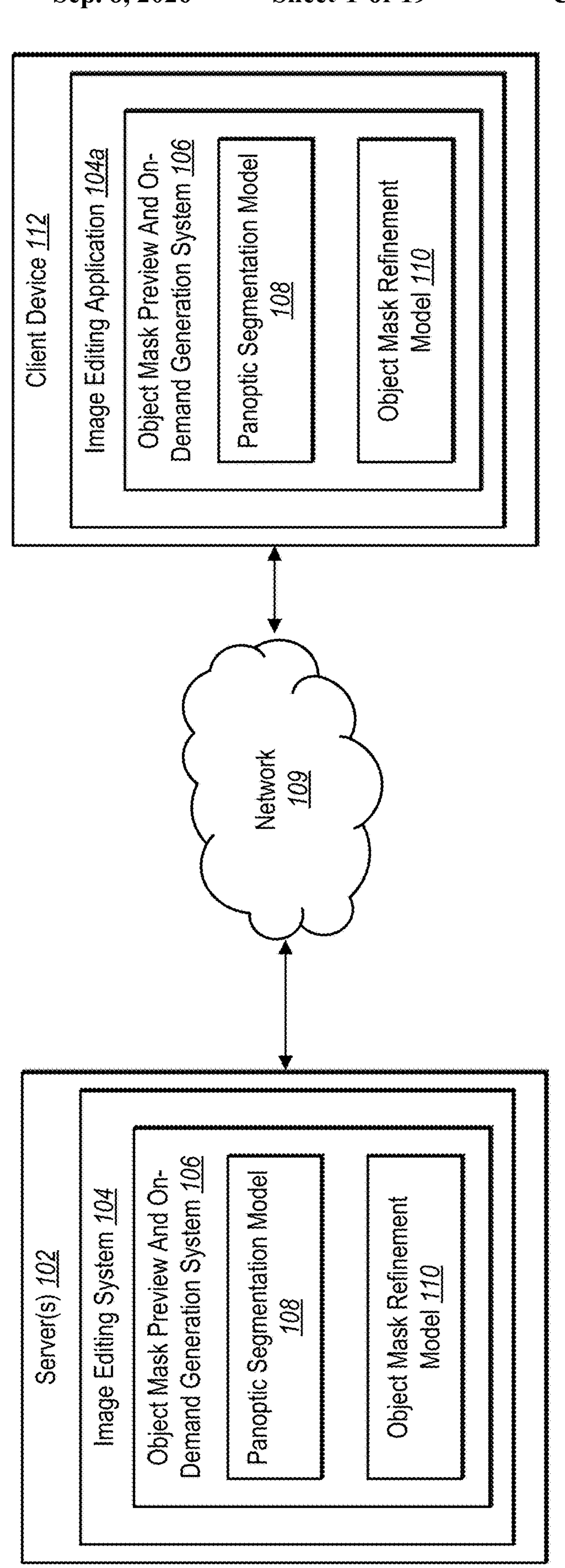
FIG. 1 illustrates an example environment in which an object mask preview and on-demand generation system operates in accordance with one or more implementations.

One or more implementations described herein provide benefits and/or solve one or more problems in the art with systems, methods, and non-transitory computer-readable media that generate preliminary object masks for objects in an image, surface the preliminary object masks as object mask previews, and converts preliminary object masks into refined object masks on-demand. Indeed, in one or more implementations, an object mask preview and on-demand generation system automatically detects objects in an image. For the detected objects, the object mask preview and on-demand generation system generates preliminary object masks. The object mask preview and on-demand generation system surfaces a given preliminary object mask in response to detecting a first input. The object mask preview and on-demand generation system also generates a refined object mask in response to detecting a second input selecting a surfaced preliminary object mask.

As such, in one or more implementations, the object mask preview and on-demand generation system, once activated, provides a preview of an object mask in response to a first user input (e.g., a cursor hovering over an object or a touch gesture on the object) without further user input. Specifically, as a user moves a cursor about a detail image, the object mask preview and on-demand generation system surfaces preliminary object masks corresponding to object under the cursor or touch gesture. Additionally, in one or more implementations, the object mask preview and on-demand generation system generates a refined object mask in response to a single, simple user input (e.g., tap or click on the object) without further user input.

In one or more implementations, the object mask preview and on-demand generation system operates within, or in connection with, an image editing application. For example, a digital image is loaded within an image editing application. In various implementations, upon loading the digital image (or detecting the selection of an auto masking tool), the object mask preview and on-demand generation system segments the digital image and generates preliminary object masks for each object within the digital image. Then, upon detecting a selection request of a target object, the object mask preview and on-demand generation system identifies and surfaces a preliminary object mask corresponding to the target object. For example, as mentioned previously, as a cursor or other input device hovers over objects, the object mask preview and on-demand generation system surfaces or displays the corresponding preliminary object mask. As such, a user can explore which objects have been identified and masked by the object mask preview and on-demand generation system by simply moving a cursor or other input device around an image.

At this point, if desired, the object mask preview and on-demand generation system allows the user to edit any preliminary object masks. For example, a user may desire to combine two preliminary object masks. Alternatively, the object mask preview and on-demand generation system may have identified a part of an object as another object. The object mask preview and on-demand generation system allows the user to combine preliminary object masks to ensure that a given preliminary object mask captures all of a desired object.

In one or more implementations, the object mask preview and on-demand generation system generates the preliminary object masks as previews. In particular, the object mask preview and on-demand generation system generates the preliminary object masks to have a lower resolution, approximate boundaries, and/or otherwise be unrefined compared to a refined object mask. As explained in greater detail below, by generating the lower-resolution preliminary object masks initially, the object mask preview and on-demand generation system is able to surface object masks faster, use less processing power, and otherwise provide greater efficiency.

As mentioned above, in one or more implementations, the object mask preview and on-demand generation system generates refined object masks. For example, having previewed various preliminary object masks, a user may desire to perform an image edit utilizing an object mask. While the preliminary object masks allow for quick previews, in one or more implementations the preliminary object masks may lack the detail and resolution required for performing an image edit process with accuracy. In response to a user selection of a preliminary object mask, the object mask preview and on-demand generation system generates a higher-resolution refined object mask. For example, the object mask preview and on-demand generation system upscales and refines the selected preliminary object mask to generate the refined object mask. The image editing application is then able to utilize the refined object mask to make one or more edits to the digital image.

As previously mentioned, the object mask preview and on-demand generation system of the present disclosure provides numerous advantages and benefits over conventional systems. Indeed, in many implementations, the object mask preview and on-demand generation system improves accuracy, flexibility, and efficiency. Specifically, by preemptively segmenting all object (and optionally object parts), the object mask preview and on-demand generation system is able to quickly return an object mask for any selected object or object part. In other works, the object mask preview and on-demand generation system utilizes the pre-emptive segmentation for any subsequent object mask previews without having to reprocess the digital image. Thus, the object mask preview and on-demand generation system both increases efficiency and reduces processing time.

In one or more implementations, the object mask preview and on-demand generation system generates the preliminary object masks utilizing a machine learning model. For example, the object mask preview and on-demand generation system utilizes a panoptic segmentation neural network to generate the preliminary object masks. In one or more implementations, the panoptic segmentation neural network comprises a lightweight architecture and is deployed on device allowing for faster processing. By generating lower-resolution preliminary object masks, the object mask preview and on-demand generation system is able to reduce processing times and allow for essentially real-time previews of object masks.

As mentioned previously, in addition to providing preliminary object masks as previews with little to no latency, the object mask preview and on-demand generation system also is able to generate refined object masks on demand. Specifically, upon selection of a preliminary object mask, the object mask preview and on-demand generation system generates a high-resolution refined object mask that is more accurate and has a higher resolution than the corresponding preliminary object mask. In one or more implementations, the object mask preview and on-demand generation system generates the refined object masks utilizing a machine learning model. For example, the object mask preview and on-demand generation system utilizes a segmentation refinement neural network to generate the refined object masks. In one or more implementations, the segmentation refinement neural network comprises a larger architecture and/or requires more computing power and processing time than the panoptic segmentation neural network.

The object mask preview and on-demand generation system is able to conserve computing resources by providing lower-resolution object masks quickly. The lower-resolution preliminary object masks allow a user to interact with and preview object masks and detected objects. Additionally, the object mask preview and on-demand generation system allows a user to combine and otherwise modify the preliminary object mask. The object mask preview and on-demand generation system provides this functionality without requiring the computing power and processing time required by larger/more complex segmentation models. When desired, however, the object mask preview and on-demand generation system provides for generation of refined object masks. By generating the refined object masks on demand, the object mask preview and on-demand generation system utilizes the more computationally intensive segmentation models only when requested.

Further, in various implementations, the object mask preview and on-demand generation system provides a graphical user interface that reduces the number of steps needed to select objects within a digital image. For example, the object mask preview and on-demand generation system pre-generates a preliminary object mask for the objects within a digital image. Then to preview the object masks, a user need only hover over a given object. Thus, unlike most conventional systems that require multiple sections to generate masks for each object in an image, the object mask preview and on-demand generation system does so in response to a single input. Along related lines, the object mask preview and on-demand generation system generates higher-resolution refined object masks in response to a single user selection (click or tap of on a preliminary object mask). Thus, unlike most conventional systems that require various tools and numerous manual operations to select an object, the object mask preview and on-demand generation system facilitates accurate selection of an object with minimal user interaction.

Additional detail regarding the object mask preview and on-demand generation system will now be provided with reference to the figures. For example, FIG. 1 illustrates a schematic diagram of an exemplary system environment 100 in which an object mask preview and on-demand generation system operates in one or more embodiments. As illustrated in FIG. 1, the system 100 includes a server(s) 102, a network 109, and client device 112.

Although the system 100 of FIG. 1 is depicted as having a particular number of components, the system 100 can have any number of additional or alternative components (e.g., any number of servers, client devices, or other components in communication with the object mask preview and on-demand generation system 106 via the network 109). Similarly, although FIG. 1 illustrates a particular arrangement of the server(s) 102, the network 109, and the client device 112, various additional arrangements are possible.

The server(s) 102, the network 109, and the client device 112 are communicatively coupled with each other either directly or indirectly (e.g., through the network 109 discussed in greater detail below in relation to FIG. 12). Moreover, the server(s) 102 and the client device 112 include computing devices such as those discussed in greater detail with relation to FIG. 12.

As mentioned above, the system 100 includes the server (s) 102. In one or more implementations, the server(s) 102 generates, stores, receives, and/or transmits data including digital visual media items, segmentation masks, and modified digital visual media items. For example, in some implementations, the server(s) 102 receives a digital visual media item from a client device 112 and transmits a segmentation mask or modified digital visual media item to the client device. In one or more implementations, the server(s) 102 comprises a data server. In some implementations, the server(s) 102 comprises a communication server or a web-hosting server.

As shown in FIG. 1, the server(s) 102 includes an image editing system 104. In one or more implementations, the image editing system 104 provides functionality by which a user (e.g., a user of one of the client device 112) generates, edits, manages, and/or stores digital visual media items. For example, in some instances, a user utilizes a client device to send a digital visual media item to the image editing system 104 hosted on the server(s) 102 via the network 109. The image editing system 104 then provides many options that the user may use to edit the digital visual media item, store the digital visual media item, and subsequently search for, access, and view the digital visual media item.

Additionally, the server(s) 102 include the object mask preview and on-demand generation system 106, which in turn can includes the panoptic segmentation model 108, and object mask refinement model 110. In particular, in one or more implementations, the object mask preview and on-demand generation system 106 utilizes the server(s) 102 to generate object masks for digital visual media items. For example, the object mask preview and on-demand generation system 106 can utilize the server(s) 102 to identify a digital visual media item and generate preliminary object masks and refined object masks for objects in a digital image or other digital visual media item.

In one or more implementations, the client device 112 include computing devices that can access, edit, store, and/or provide, for display, digital visual media items. For example, the client device 112 can include smartphones, tablets, desktop computers, laptop computers, head-mounted-display devices, or other electronic devices. The client device 112 include one or more applications (e.g., the image editing application **104*a*) that can access, edit, segment, modify, store, and/or provide, for display, digital visual media items. For example, in one or more implementations, the image editing application 104*a* includes a software application installed on the client device 112. Additionally, or alternatively, the image editing application 104*a* includes a software application hosted on the server(s) 102 (and supported by the image editing system 104 on the server), which may be accessed by the client device 112** through another application, such as a web browser.

In particular, in some implementations, the object mask preview and on-demand generation system 106 on the server(s) 102 supports the object mask preview and on-demand generation system 106 on the client device 112. For instance, the object mask preview and on-demand generation system 106 learns parameters for the various neural networks and machine learning models. The digital content editing system 106 then provides the neural networks and machine learning models to the client device 112. In other words, the client device 112 obtains (e.g., downloads) the neural networks and machine learning models with the learned parameters from the server(s) 102. Once downloaded, the object mask preview and on-demand generation system 106 on the client device 112 utilizes the neural networks and machine learning models to generate preliminary object mask and refined object masks independent from the server(s) 102.

In alternative implementations, the object mask preview and on-demand generation system 106 includes a web hosting application that allows the client device 112 to interact with content and services hosted on the server(s) 102. To illustrate, in one or more implementations, the client device 112 accesses a web page via the supported by the server(s) 102. For example, the client device 112 provides a digital image to the server(s) 102, and, in response, the object mask preview and on-demand generation system 106 on the server(s) 102 generates an object mask. The server(s) 102 then provides the object mask to the client device 112 for display or editing of the digital image.

In still further implementations, the client devices 112 utilizes one or more machine learning models or neural networks of the object mask preview and on-demand generation system 106 to generate preliminary object masks of objects in a digital image. The server(s) 102 on the other hand utilize one or more machine learning models or neural networks of the object mask preview and on-demand generation system 106 to generate refined object masks of objects in a digital image. Thus, the functionality of the object mask preview and on-demand generation system 106 is deployable by the server(s) 102, the client device 112, or a combination thereof.

Indeed, the object mask preview and on-demand generation system 106 can be implemented in whole, or in part, by the individual elements of the system 100. Indeed, although FIG. 1 illustrates the object mask preview and on-demand generation system 106 implemented with regard to the server(s) 102, different components of the object mask preview and on-demand generation system 106 can be implemented by a variety of devices within the system 100. For example, one or more (or all) components of the object mask preview and on-demand generation system 106 can be implemented by a different computing device (e.g., one of the client device 112) or a separate server from the server(s) 102 hosting the image editing system 104.

Figure 2:
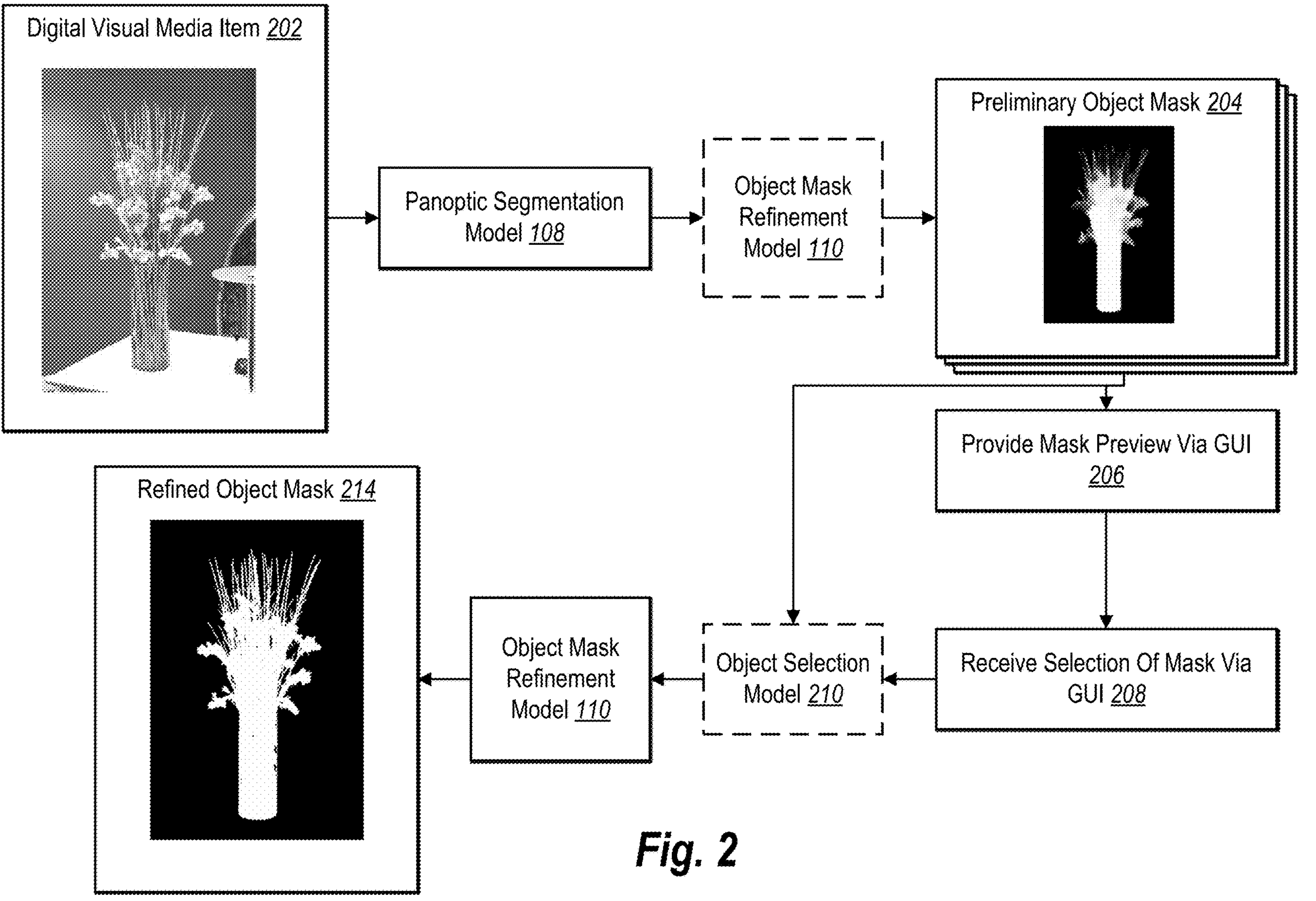
FIG. 2 illustrates an overview diagram of the object mask preview and on-demand generation system generating a preliminary object mask and generating a corresponding refined object mask in response to a selection of a preview of the preliminary object mask in accordance with one or more implementations.

FIG. 2 illustrates an overview diagram of the object mask preview and on-demand generation system 106 generating one or more object masks of one or more objects in a digital visual media item 202. In one or more implementations, a digital visual media item includes any digital item capable of producing a visual representation. In particular, in some implementations, a digital visual media item includes a digital item, such as a digital image (e.g., a digital photo or other digitally-created image) or digital video. In some implementations, a digital visual media item includes to a digital video or other camera feed. Further, in some instances, a digital video media item includes a video frame of a previously-captured digital video or a video frame of a digital video feed.

In one or more implementations, a digital visual media item depicts one or more objects (e.g., as shown by the digital visual media item 202). In one or more implementations, an object includes a distinguishable element depicted in a digital visual media item. For example, in some implementations, an object includes a person, an item, a natural object (e.g., a tree or rock formation) or a structure depicted in a digital visual media item. In some instances, an object includes a plurality of elements that, collectively, can be distinguished from other elements depicted in a digital visual media item. For example, in some instances, an object includes a collection of buildings that make up a skyline. In some instances, an object more broadly includes a foreground or other element(s) depicted in a digital visual media item as distinguished from a background. For example, the digital visual media item 202 has objects including a vase with flowers, a table, a computer mouse, a chair, a wall in the background, a stand, and a chair back.

In one or more implementations, the object mask preview and on-demand generation system 106 determines (e.g., identifies) the digital visual media item 202 by receiving the digital visual media item 202 from a computing device (e.g., a third-party system or a client device) or receiving user input identifying the digital visual media item 202 for object masking In some implementations, however, the object mask preview and on-demand generation system 106 determines the digital visual media item 202 by accessing a database storing digital visual media items. For example, in at least one implementation, the object mask preview and on-demand generation system 106 maintains a database and stores a plurality of digital visual media items therein. In some instances, an external device or system stores digital visual media items for access by the object mask preview and on-demand generation system 106.

As discussed above, the object mask preview and on-demand generation system 106 operates on a computing device (e.g., the server(s) 102 or client device 112, such as smart phone or tablet). Accordingly, in some implementations, the object mask preview and on-demand generation system 106 identifies the digital visual media item 202 by accessing the digital visual media item 202 from local storage, detecting that the computing device has captured the digital visual media item 202, or by determining that the computing device has activated a camera to capture the digital visual media item 202 (e.g., is capturing a digital video feed or is setup to capture a digital photo).

As shown by FIG. 2, the object mask preview and on-demand generation system 106 utilizes a panoptic segmentation model 108 to generate preliminary object masks 204 for the objects in the digital visual media item 202. Also, the object mask preview and on-demand generation system 106 then utilizes an object mask refinement model 110 to generate a refined object mask 214 in response to a selection of the preliminary object mask 204 in accordance with one or more implementations. Both the panoptic segmentation model 108 and the object mask refinement model 110 comprise machine learning models. For example, in one or more implementations, as explained in greater detail below, each of the panoptic segmentation model 108 and the object mask refinement model 110 comprise a neural network configured to generate or refine object masks. In particular, in one or more implementations, the panoptic segmentation model 108 includes a panoptic segmentation neural network and the object mask refinement model 110 includes a segmentation refinement neural network.

Generally, in one or more implementations, a neural network includes a machine learning model that can be tuned (e.g., trained) based on inputs to approximate unknown functions used for generating the corresponding outputs. Indeed, in some implementations, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some implementations, a neural network includes a convolutional neural network, a recurrent neural network (e.g., a long short-term memory neural network), a generative adversarial neural network, a graph neural network, or a multi-layer perceptron. In some implementations, a neural network includes a combination of neural networks or neural network components.

More particularly, in one or more implementations, a neural network includes a computer-implemented neural network that generates and/or refines object masks for digital visual media items. Indeed, in some implementations, a panoptic segmentation neural network analyzes a digital visual media item to identify and mask object instances in a digital visual media item. A segmentation refinement neural network generates one or more refined objects masks based on the a preliminary object mask and the digital visual media item. For example, in one or more implementations, a neural network is composed of an encoder-decoder network architecture. For instance, in some implementations, the panoptic segmentation neural network includes an encoder, one or more object detection heads, and one or more object masking heads. Similarly, the segmentation refinement neural network, in one or more implementations, includes an encoder and a recursive or iterative decoder. In some cases, the recursive decoder includes a deconvolution branch and a refinement branch. Example architectures of the panoptic segmentation neural network and the refinement neural network will be discussed in more detail below.

As mentioned, FIG. 2 illustrates an overview of the object mask preview and on-demand generation system 106 automatically generating preliminary object masks 204 for objects in a digital visual media item (e.g., a digital image) 202 and a refined object mask 214. In one or more implementations, an object mask generally includes an identification of pixels in a digital visual media item that represent an object. In particular, in some implementations, an object mask includes a filter useful for partitioning a digital visual media item into separate portions. For example, in some cases, an object mask includes a filter that corresponds to a digital visual media item and identifies a portion of the digital visual media item (i.e., pixels of the digital visual media item) belonging to one or more objects and a portion of the digital visual media item belonging to a background or other objects. For example, in some implementations, an object mask includes a map of a digital visual media item that has an indication for each pixel of whether the pixel corresponds to part of an object or not. In some implementations, the indication includes a binary indication (a 1 for pixels belonging to the object and a zero for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

Relatedly, in one or more implementations a preliminary object mask includes an object mask generated directly from a corresponding digital visual media item. For example, in some implementations an initial object mask includes a first object mask generated by a panoptic segmentation model based on a digital visual media item. In one or more implementations, a preliminary object mask has a lower resolution or is otherwise less accurate or refined than a refined object mask. Furthermore, in one or more implementations, the object mask preview and on-demand generation system 106 utilizes less time and/or processing power to generate a preliminary object mask compared to a corresponding refined object mask. In one or more implementations, preliminary object mask includes an object mask that corresponds to the digital image but has a resolution that is lower than the resolution of the digital image (e.g., the original resolution). For example, in some implementations, the preliminary object mask includes the same resolution as a low-resolution copy of the digital image. In some cases, the preliminary object mask includes a resolution that is between the resolution of a low-resolution copy of the digital image and the original resolution associated with the digital image.

Also, in one or more implementations, a refined object mask includes an object mask generated based on another object mask, such as a preliminary object mask or a preceding refined object mask. In particular, in some instances, a refined object mask includes an object mask having pixels that have been re-analyzed or re-classified to indicate whether or not those pixels belong to an object portrayed in the digital visual media item. For example, in some implementations, a refined object mask includes an object mask having one or more pixels that were indicated, in a previous object mask, as being uncertain as to whether or not they belong to an object but have since been determined to belong or not belong to an object with a greater certainty. In one or more implementations, a refined object mask has a higher resolution than a preliminary object mask from which the refined object mask is generated. In one or more implementations, a refined object mask has the same resolution as a digital visual media item from which the preliminary object mask and the refined object mask are generated. Furthermore, in one or more implementations, the object mask preview and on-demand generation system 106 utilizes more time and/or processing power to generate a refined object mask compared to a corresponding preliminary object mask.

To generate the preliminary object masks 204 for the objects in the digital visual media item 202, in one or more implementations, the object mask preview and on-demand generation system 106 utilizes a lower resolution version of the digital visual media item 202. For example, the object mask preview and on-demand generation system 106 down samples the digital visual media item 202 to a reduced image size. Alternatively, the object mask preview and on-demand generation system 106 accesses a lower-resolution copy of the digital visual media item 202.

In one or more implementations, a resolution includes a number of pixels. In particular, in some implementations, a resolution includes the number of pixels depicted in a digital image or a corresponding object mask. In one or more implementations, a relatively higher resolution corresponds to a relatively greater degree of detail reflected in the digital image or object mask, especially with regard to fine or complex details (e.g., hair, fur, textures, etc.). In some implementations, a high resolution includes a resolution at 2K (e.g., 2560×1440 pixels) or above. Accordingly, in some cases, a low resolution includes a resolution below 2K. It should be understood, however, that in many instances, the terms “low” and “high” are relative so that a high resolution includes a resolution having a greater number of pixels than another resolution and, similarly, a low resolution includes a resolution having a lower number of pixels than another resolution. To illustrate, in one or more implementations, the digital image includes a resolution at or above 2K, and the object mask preview and on-demand generation system 106 generates a low-resolution copy of the digital image by generating a digital copy of the digital image having a resolution below 2K.

As indicated, a resolution corresponds to a number of pixels. In one or more implementations, a pixel includes a unit of a digital image or an object mask. In particular, in some implementations, a pixel includes the smallest distinguishable element of a digital image or an object mask. Indeed, as suggested above, in some cases, a digital image or an object mask includes a plurality of pixels that collectively correspond to one or more portions of the digital image or the object mask, respectively.

In one or more implementations, the object mask preview and on-demand generation system 106 utilizes the panoptic segmentation model 108 to generate preliminary object masks 204 for the objects in the digital visual media item 202 from a low-resolution copy of the digital visual media item 202. In one or more implementations the panoptic segmentation model 108 comprises a neural network. For example, in one or more implementations, the panoptic segmentation model 108 comprises an object detection and object masking neural network or DOMO as described in previously incorporated U.S. Provisional Patent Application No. 63/271,147 and FIG. 6 below. In alternative implementations, the panoptic segmentation model 108 comprises a panoptic segmentation neural network as described in U.S. patent application Ser. No. 17/319,979, filed on May 13, 2021 and entitled "GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES," the entire contents of which are hereby incorporated by reference. In still further implementations, the panoptic segmentation model 108 comprises a class-agnostic object segmentation neural network as described in U.S. patent application Ser. No. 17/151,111, filed on Jan. 15, 2021 and entitled "GENERATING CLASS-AGNOSTIC OBJECT MASKS IN DIGITAL IMAGES," the entire contents of which are hereby incorporated by reference.

In any event, the object mask preview and on-demand generation system 106 utilizes the panoptic segmentation model 108 to generate preliminary object masks 204 for the objects in the digital visual media item 202. In other words, in one or more implementations, the panoptic segmentation model 108 generates a preliminary object mask 204 for each object in the digital visual media item 202 (i.e., the vase with flowers, the table, the computer mouse, the chair, the wall in the background, the stand, and the chair back).

As shown in FIG. 2, the object mask preview and on-demand generation system 106 optionally performs a refinement of initial object masks generated by the panoptic segmentation model 108 as part of generating the preliminary object masks 204. In particular, the object mask preview and on-demand generation system 106 optionally utilizes the object mask refinement model 110 to refine object mask outputted by the panoptic segmentation model 108 to produce the preliminary object masks 204. More specifically, the object mask preview and on-demand generation system 106 utilizes the object mask refinement model 110 to refine or improve the identification of pixels as belonging to a given object or not. When refining an object mask output of the panoptic segmentation model 108 as part of generating a preliminary object mask 204, the object mask preview and on-demand generation system 106, in one or more implementations, does not perform any upscaling of the object mask output of the panoptic segmentation model 108.

In one or more implementations, the object mask refinement model 110 refines the object mask output of the panoptic segmentation model 108 utilizing a filtering process. For example, the object mask refinement model 110 preforms guided filtering and optionally a morphological operation on an object mask output from the panoptic segmentation model 108 to generate the preliminary object masks 204. More specifically, the object mask refinement model 110 performs the guided filtering on an object mask output from the panoptic segmentation model 108 by determining a filtering output by considering the content of the low-resolution version of the digital visual media item 202. In other words, the object mask refinement model 110 utilizes the guided filtering to improve the object mask output from the panoptic segmentation model 108 to recapture details (particularly along borders) from low-resolution version of the digital visual media item 202 lost during the generation of the object mask by the panoptic segmentation model 108. In one or more implementations, the object mask refinement model 110 utilizes a bilateral filter, a guided bilateral filter, or a guided filter such as that described in U.S. Pat. No. 9,342,869, the entire contents of which are hereby incorporated by reference in their entirety. In another implementation, the object mask refinement model 110 utilizes a guided filter such as that described by He et al. in Guided Image Filtering, IEEE TRANSACTIONS ON PATTERN ANALYSIS AND MACHINE INTELLIGENCE, VOL. 35, 2013, the entire contents of which are hereby incorporated by reference in their entirety. Alternatively, the object mask refinement model 110 utilizes a guided filter such as that described by He et al. in Fast Guided Filter, Computer Vision and Pattern Recognition, arXiv: 1505.00996, 2015, the entire contents of which are hereby incorporated by reference in their entirety.

Additionally, the object mask refinement model 110 optionally performs a morphological operation (i.e., binarization of the object mask output from the panoptic segmentation model 108). For example, the object mask refinement model 110 performs erosion and the dilation or dilation and then erosion. In particular, the object mask refinement model 110 performs morphological erosion to remove islands and small artifacts to improve the object mask output from the panoptic segmentation model 108. Along related lines, the object mask refinement model 110 performs morphological dilation to fill small holes in the object mask output from the panoptic segmentation model 108.

Alternatively, or additionally, in one or more implementations, the object mask refinement model 110 comprises a neural network. For example, in one or more implementations, the object mask refinement model 110 comprises a mask upscaling and refinement neural network as described in previously incorporated U.S. Provisional Patent Application No. 63/271,147 and FIG. 8 below. In such implementations, the object mask refinement model 110 refines a single patch (the entire object mask output from the panoptic segmentation model 108) and without upscaling. For example, (in reference to FIG. 8) the object mask refinement model 110 performs a single refinement in the refinement branch and does not perform any upscaling as part of generating the preliminary object masks 204.

Having generated the preliminary object masks, the object mask preview and on-demand generation system 106 provides the digital visual media item 202 via a graphical user interface. In response to detecting a first user input of a given object in the digital visual media item 202, the object mask preview and on-demand generation system 106 surfaces or provides 206 a corresponding preliminary object mask 204. For example, in response to a cursor hovering over the vase and flowers, the object mask preview and on-demand generation system 106 surfaces the preliminary object mask of the vase and flowers 204 over the digital visual media item 202. As the cursor moves over another object in the digital visual media item 202, the object mask preview and on-demand generation system 106 surfaces the corresponding preliminary object mask.

In response to another user input selecting 208 a given preliminary object mask 204, like a tap or click, the object mask preview and on-demand generation system 106 automatically converts the preliminary object mask 204 for that object into a refined object mask 214. For example, the object mask preview and on-demand generation system 106 optionally uses an object selection model 210 to refine the preliminary object mask 204. In one more implementation, the object selection model 210 is a deep lasso system. In other words, the object selection model 210 corresponds to one or more deep neural networks or models that select an object based on a loose boundary corresponding to the object within an image. For example, in one or more implementations, the object selection model 210 utilizes the techniques and approaches found in Ning Xu et al., "Deep GrabCut for Object Selection," published Jul. 14, 2017, the entirety of which is incorporated herein by reference. For example, the object selection model 210 utilizes a deep grad cut approach rather than saliency mask transfer. As another example, the object selection model 210 utilizes the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; or U.S. Pat. No. 10,192,129, "Utilizing Interactive Deep Learning To Select Objects In Digital Visual Media," filed Nov. 18, 2015, each of which are incorporated herein by reference in their entirety.

Because the preliminary object mask 204 may contain one or more errors due to its low resolution, the object mask preview and on-demand generation system 106 optionally uses the object selection model 210 to revise the preliminary object mask 204. In particular, the object selection model 210 utilizes the preliminary object mask 204 as a guide to automatically select a more accurate object boundary from the digital visual media item 202.

The object mask preview and on-demand generation system 106 utilizes the preliminary object mask 204 or the automatically selected boundary from the object selection model 210 as input to the object mask refinement model 110. In particular, the object mask preview and on-demand generation system 106 refines and upscales the preliminary object mask 204 or the automatically selected boundary from the object selection model 210 to generate a refined object mask 214. In particular, the object mask refinement model 110, in this instance, utilizes a segmentation refinement neural network to refine and upscale the preliminary object mask 204 as described in greater detail in relation to FIGS. 7 and 8. Indeed, the object mask refinement model 110 utilizes a segmentation refinement neural network to recursively refine that preliminary object mask 204 to generate a refined object mask 214. As mentioned above, the refined object mask 214 is more accurate than the preliminary object mask 204 and optionally has a higher resolution.

In one or more implementations, the image editing system 104 utilizes the refined object mask 214 to modify the digital visual media item 202. For example, in some implementations, the image editing system 104 applies a filter or a digital effect to the digital visual media item 202 based on the refined object mask 214. In alternative implementations, the image editing system 104 utilizes the refined object mask 214 to generate a composite digital image that combines one or more objects from the digital visual media item 202 with another digital image.

As mentioned above, in one or more implementations, the object mask preview and on-demand generation system 106 generates the preliminary object masks and surfaces them as previews. For example, FIGS. 3A-3F illustrate graphical user interfaces displaying a digital image with objects and provides examples of the object mask preview and on-demand generation system 106 surfacing preliminary object masks for the objects and a refined object mask for a selected preliminary object mask.

As shown, FIGS. 3A-3F illustrate a client device 300 having a graphical user interface 302 of an image editing system 104 that includes a digital image 304. In various implementations, the client device 300 represents the client device 112 introduced above with respect to FIG. 1. As illustrated, the client device 300 includes an image editing application that implements the image editing system 104, which utilizes the object mask preview and on-demand generation system 106. The object mask preview and on-demand generation system 106, or optionally the image editing application, generates the graphical user interface 302 in FIGS. 3A-3F.

Figure 3A:
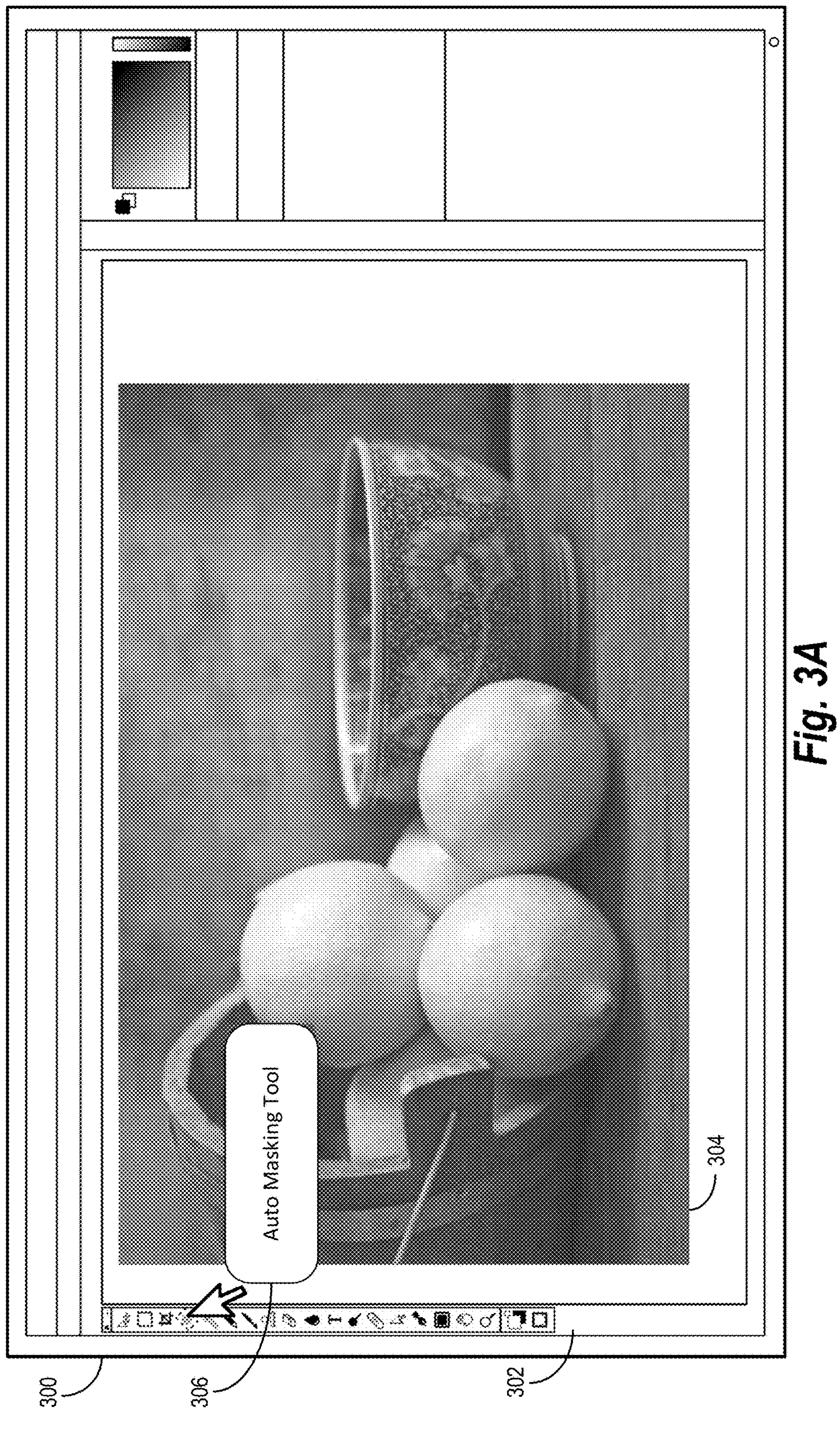
FIGS. 3A-3F illustrate graphical user interfaces showing preview object masks provided in response to hovering over objects and a refined object mask provided in response to a selection of an object in accordance with one or more implementations.

In various implementations, the image editing application facilitates user interaction with the digital image 304. As shown in FIG. 3A, in one or more implementations, a user can select an auto masking tool 306 from a menu or toolbar provided by the image editing application in the graphical user interface 302. In response to selection of the auto masking tool 306 (e.g., in response to a request to discover or mask objects within the digital image 304), the object mask preview and on-demand generation system 106 automatically detects object instances and generates preliminary object masks for the detected objects as described above in relation to FIG. 2. The object mask preview and on-demand generation system 106 initially generates preliminary object masks and surfaces them as previews rather than refined object masks to reduce latency and reduce computing resources.

Figure 3B:
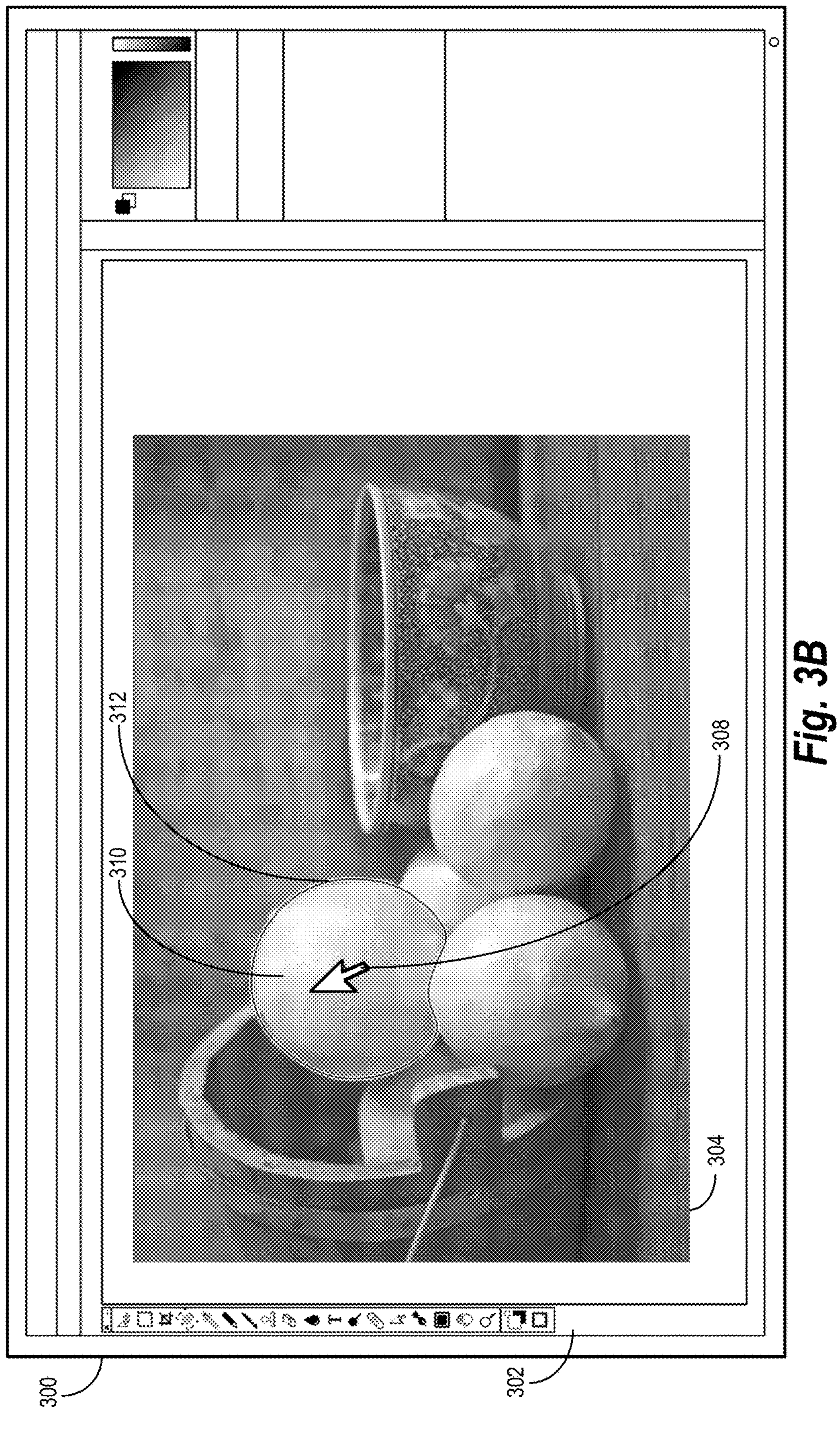

As shown in the FIG. 3B, a pointer 308 (e.g., a mouse pointer) that is controlled by a user of the client device 300 provides a visual cue as to a location of user input. Upon generating the preliminary object masks for the objects of the digital image 304, the object mask preview and on-demand generation system 106 detects a user input moving or placing the pointer 308 over an object (i.e., a first lemon 310). In response to the pointer 308 hovering over the first lemon 310, the image editing application surfaces the preliminary object mask 312 generated by the object mask preview and on-demand generation system 106. While FIGS. 3B-3F include a pointer 308, the image editing application and/or the object mask preview and on-demand generation system 106 is able to detect other forms of user input, such as touch input on a touchscreen of the client device 300 or input from another device paired to the client device 300. Thus, in alternative implementations, the image editing application surfaces the preliminary object mask 312 generated by the object mask preview and on-demand generation system 106 in response to a finger or other input device moving on the graphical user interface over the first lemon 310.

Because the object mask preview and on-demand generation system 106 automatically and without user input (other than selection of the auto masking tool 306) detects all the objects in the digital image 304 and generates preliminary object masks for all the objects, the object mask preview and on-demand generation system 106 only requires minimal user input to preview object masks for every object in the image. As mentioned, in response to a first user input, such as hovering over an object or short/light tap gesture, the object mask preview and on-demand generation system 106 surfaces an object mask preview (e.g., a preliminary object mask) for the object.

Figure 3C:
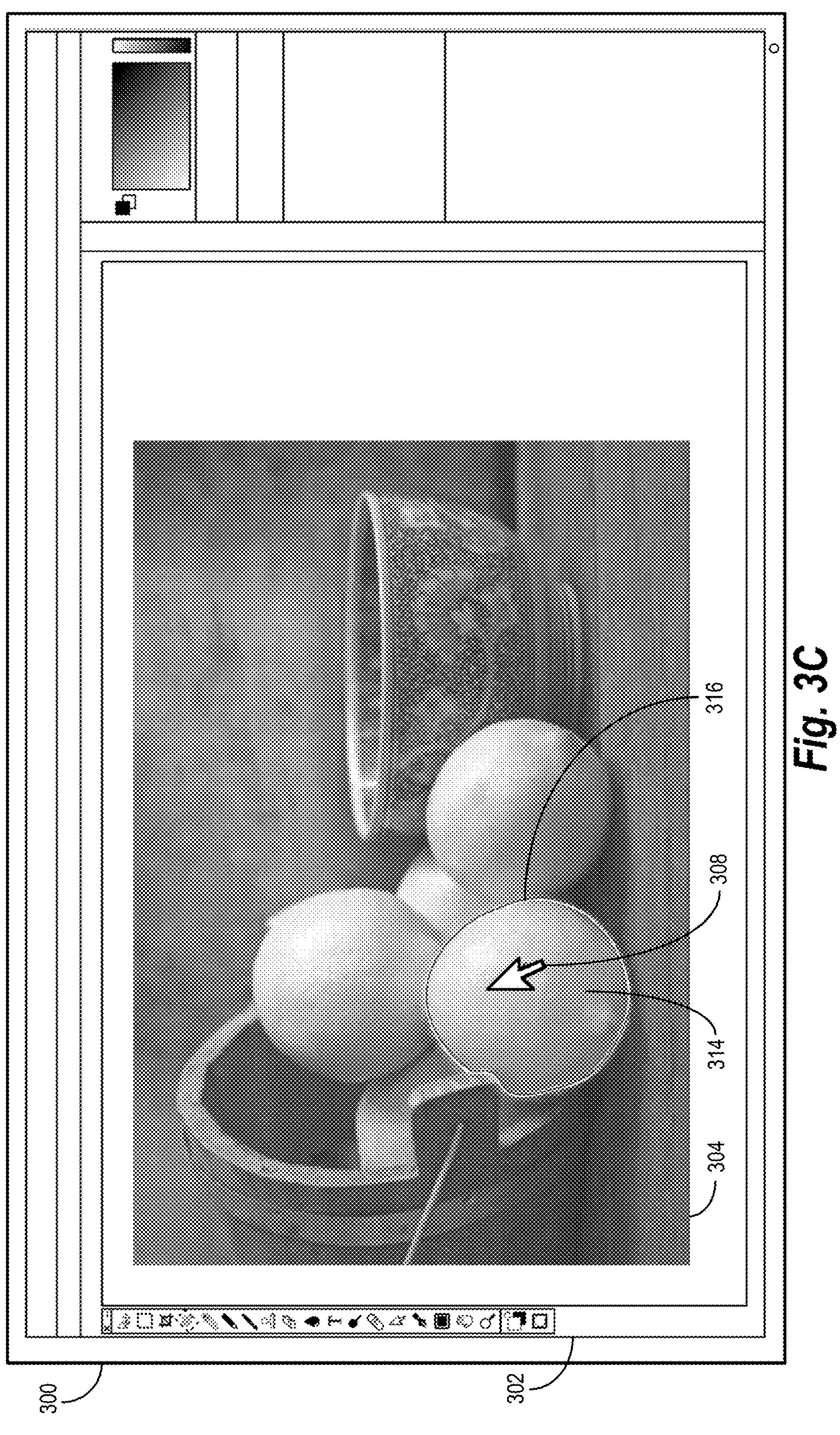

As the user moves or changes a location of the first user input (e.g., as the pointer 308 moves about the digital image 304), the object mask preview and on-demand generation system 106 surfaces the preliminary object mask for the object beneath the pointer 308 as a preview. For example, FIG. 3C illustrates that in response to detecting the pointer 308 move over a second object (i.e., a second lemon 314), the object mask preview and on-demand generation system 106 surfaces a preliminary object mask 316 for the second lemon 314. The object mask preview and on-demand generation system 106 also ceases to surface or removes the preliminary object mask 312 for the first lemon 310.

Figure 3D:
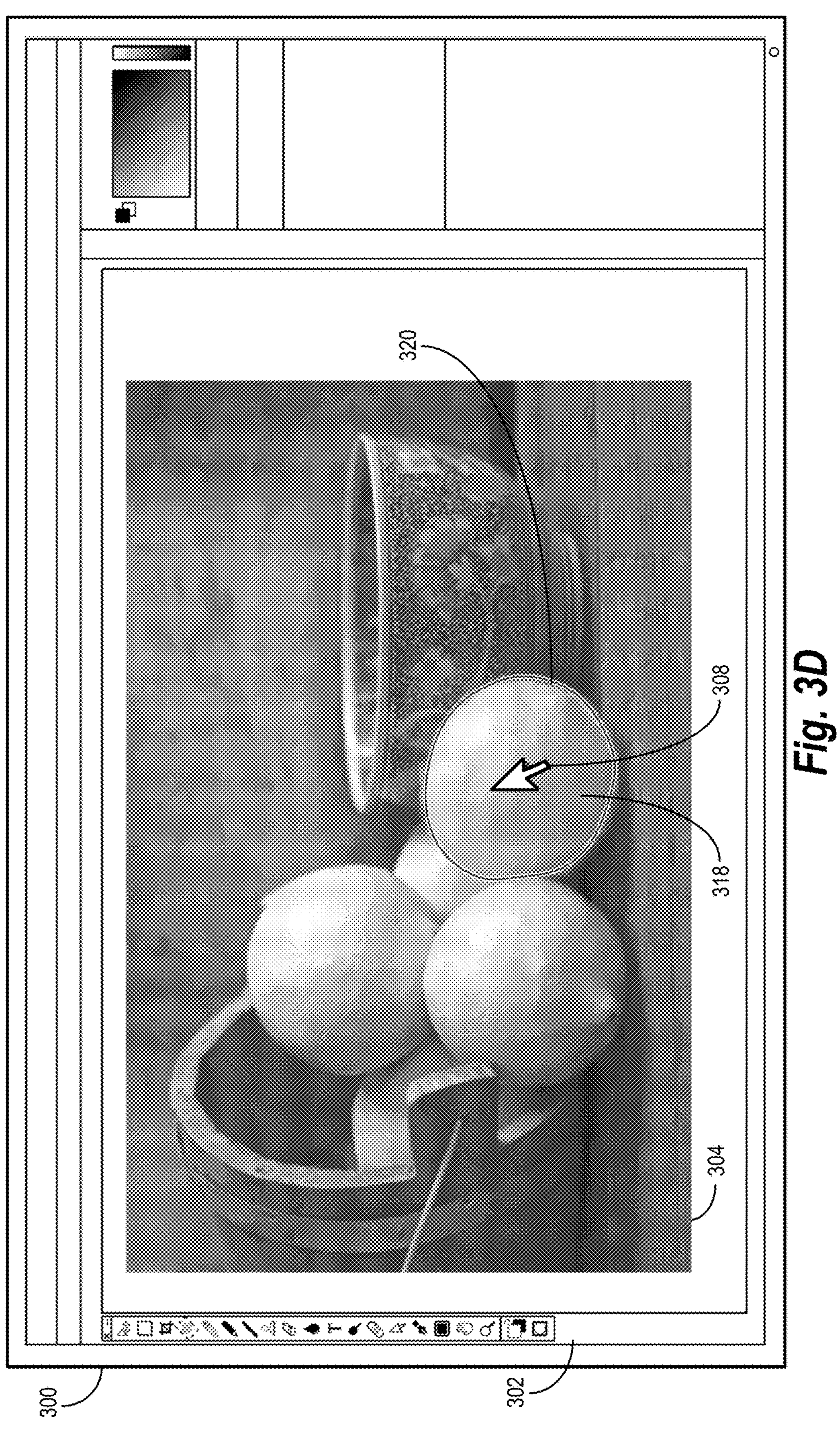
Figure 3E:
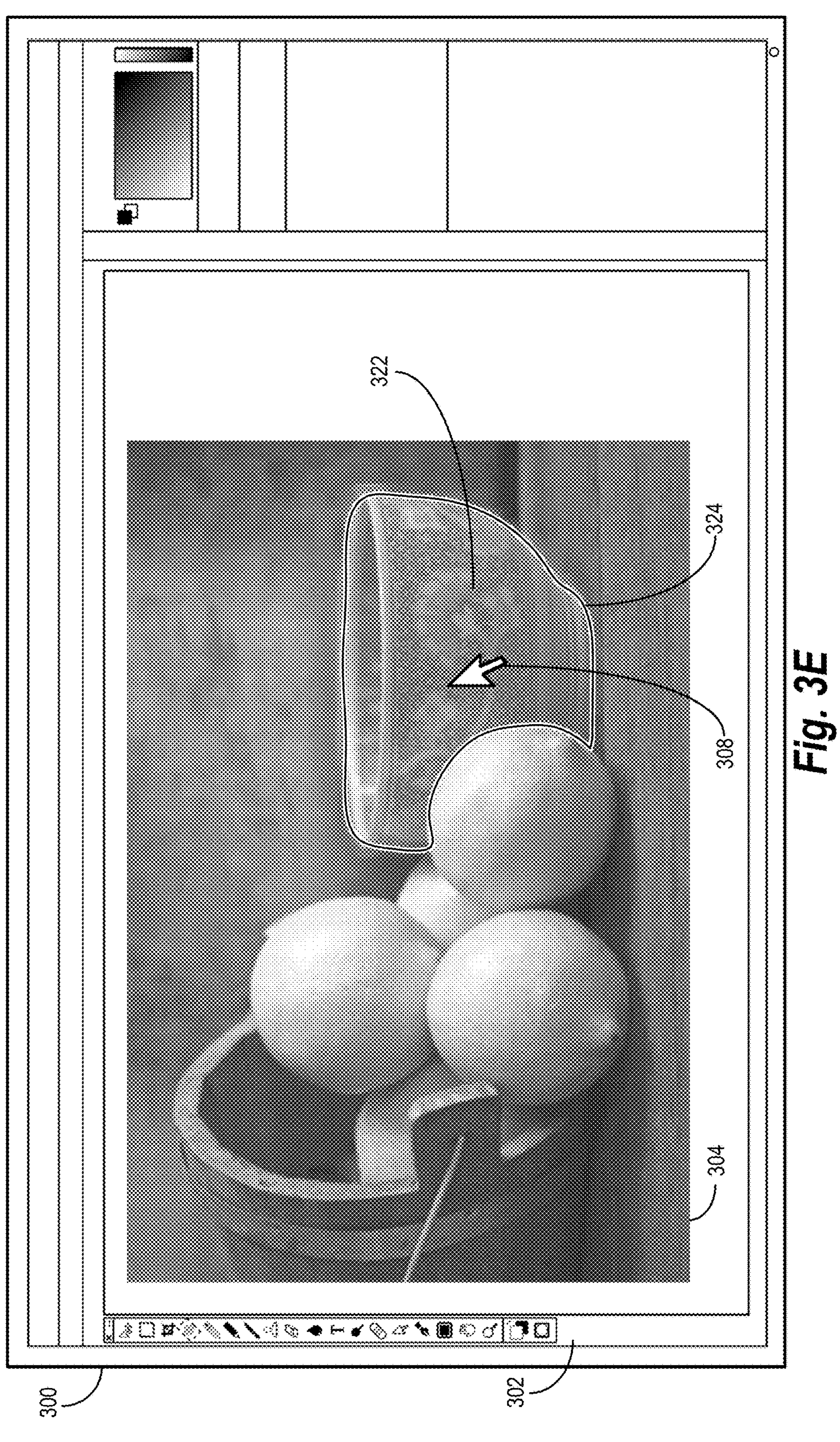

Similarly, as shown in FIG. 3D when the cursor or pointer 308 is moved over a third object (i.e., a third lemon 318), the object mask preview and on-demand generation system 106 displays or surfaces a corresponding preliminary object mask 320. Still further, FIG. 3E shows once again in response to detecting the pointer 308 move over yet another object (i.e., the bowl 322), the object mask preview and on-demand generation system 106 displays a corresponding automatically generated preliminary object mask 324. One will appreciate in light of the disclosure herein that the object mask preview and on-demand generation system 106 can surface preliminary object masks as previews for each object in a digital image in response to a simple user input.

Additionally, in one or more implementations, the object mask preview and on-demand generation system 106 surfaces the preliminary object masks for every object detected in the digital image 304 simultaneously in response to another user input. For example, in response to detecting a user shortcut key or other option, the object mask preview and on-demand generation system 106 provides all of the generated preliminary objects masks for the digital image 304 at the same time to allow the user to see what the object mask preview and on-demand generation system 106 has detected and what objects are available to select.

In response to detecting the selection request based on the user interaction, in one or more implementations, the object mask preview and on-demand generation system 106 automatically selects a target object (e.g., surfaces the preliminary object mask). In response to detecting the selection request, in various implementations, the object mask preview and on-demand generation system 106 utilizes the location of the user input (e.g., pointer 308 or touch tap) to identify the preliminary object mask to surface. Because the object mask preview and on-demand generation system 106 generates preliminary object masks for all objects in the digital image 304 before detecting a selection request, the object mask preview and on-demand generation system 106 is able to quickly provide the corresponding preliminary object mask. In this manner, as the user moves or hovers over, different target objects, the object mask preview and on-demand generation system 106 is able to quickly update a graphical user interface 302, as shown in relation to FIGS. 3A-3E, to select different corresponding objects. Further, the object mask preview and on-demand generation system 106 is able to provide a preliminary object mask for every object in the digital image 304. Indeed, regardless of which target object the user requests, the object mask preview and on-demand generation system 106 is able to provide a corresponding preliminary object mask.

In the case of overlapping objects or object parts (a shirt, a face, and pants are all separate objects but also part of single larger object, a person), the object mask preview and on-demand generation system 106 determines that a single user input (e.g., hover) corresponds to multiple object mask previews. In these implementations, the object mask preview and on-demand generation system 106 surfaces all of the preliminary object masks corresponding to the location, provide a selection interface showing each corresponding preliminary object mask or partial preliminary object mask and allows the user to select one. Alternatively, the object mask preview and on-demand generation system 106 displays all of the preliminary object masks corresponding to the location in a loop and allows the user to make a selection of one of the preliminary object masks.

Figure 3F:
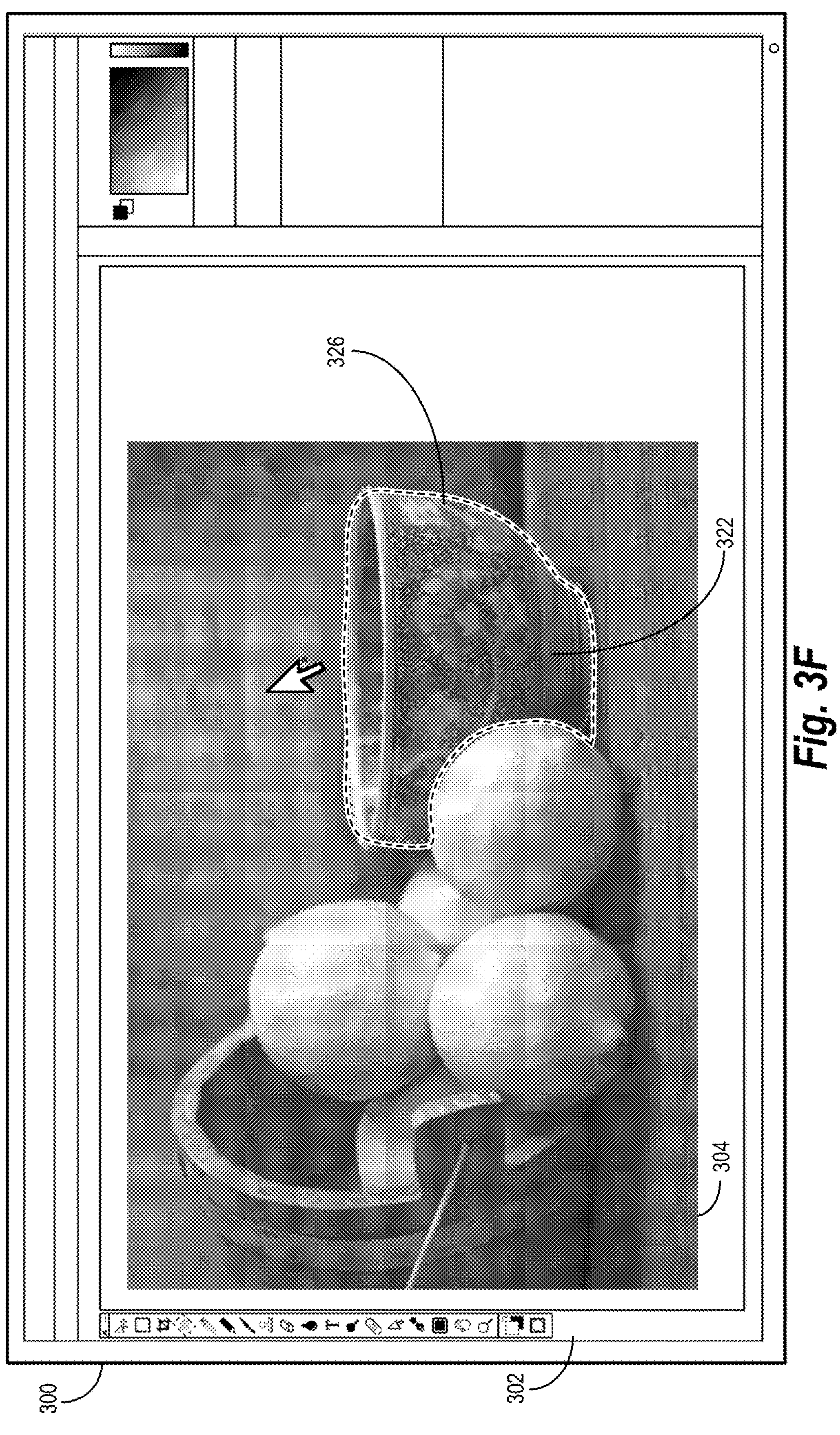

FIG. 3F illustrates that in response to detecting a second user input, the object mask preview and on-demand generation system 106 automatically generates (i.e., without further user input) a refined object mask for a given object. In particular in response to detecting a long/heavy touch or a click or other selection of a surfaced preliminary object mask or underlying object, the object mask preview and on-demand generation system 106 automatically converts or refines the preliminary object mask 324 (e.g., low-resolution object mask) of the bowl 322 into a refined object mask 326 (e.g., high-resolution object mask). As shown by FIG. 3F in response to the second user input, the object mask preview and on-demand generation system 106 removes the preliminary object mask 324 of the bowl 322 and generates and surfaces a refined object mask 326 of the bowl 322.

As mentioned the only user input required to generate the refined object mask 326 is a single tap/click on the object. This is in contrast to conventional systems, which require in the best case scenario, a bounding box, and in the worst case scenario, a detailed and time-consuming manually drawn border of the object. Thus, the object mask preview and on-demand generation system 106 intelligently uses computing resources and automates complicated editing processes that typically require tedious user input.

While FIGS. 3B-3E illustrate the object mask preview and on-demand generation system 106 surfacing preliminary object masks as solid boarder lines around an object, in alternative implementations the object mask preview and on-demand generation system 106 surfaces the preliminary object masks in a different manner. For example, the object mask preview and on-demand generation system 106 surfaces the preliminary object masks by highlighting an object, changing a color of an object, applying a filter to the object, surrounding the object with a dashed boarder line, or in other manners. Similarly, while FIG. 3F illustrates the object mask preview and on-demand generation system 106 surfacing a refined object mask as a dashed boarder line around an object, in alternative implementations the object mask preview and on-demand generation system 106 surfaces the refined object masks in a different manner. For example, the object mask preview and on-demand generation system 106 replaces all of the other pixels in the digital image 304 other than those corresponding to the refined object mask with a blank background or highlights an object, changes a color of an object, applies a filter to the object, etc.

Figure 4:
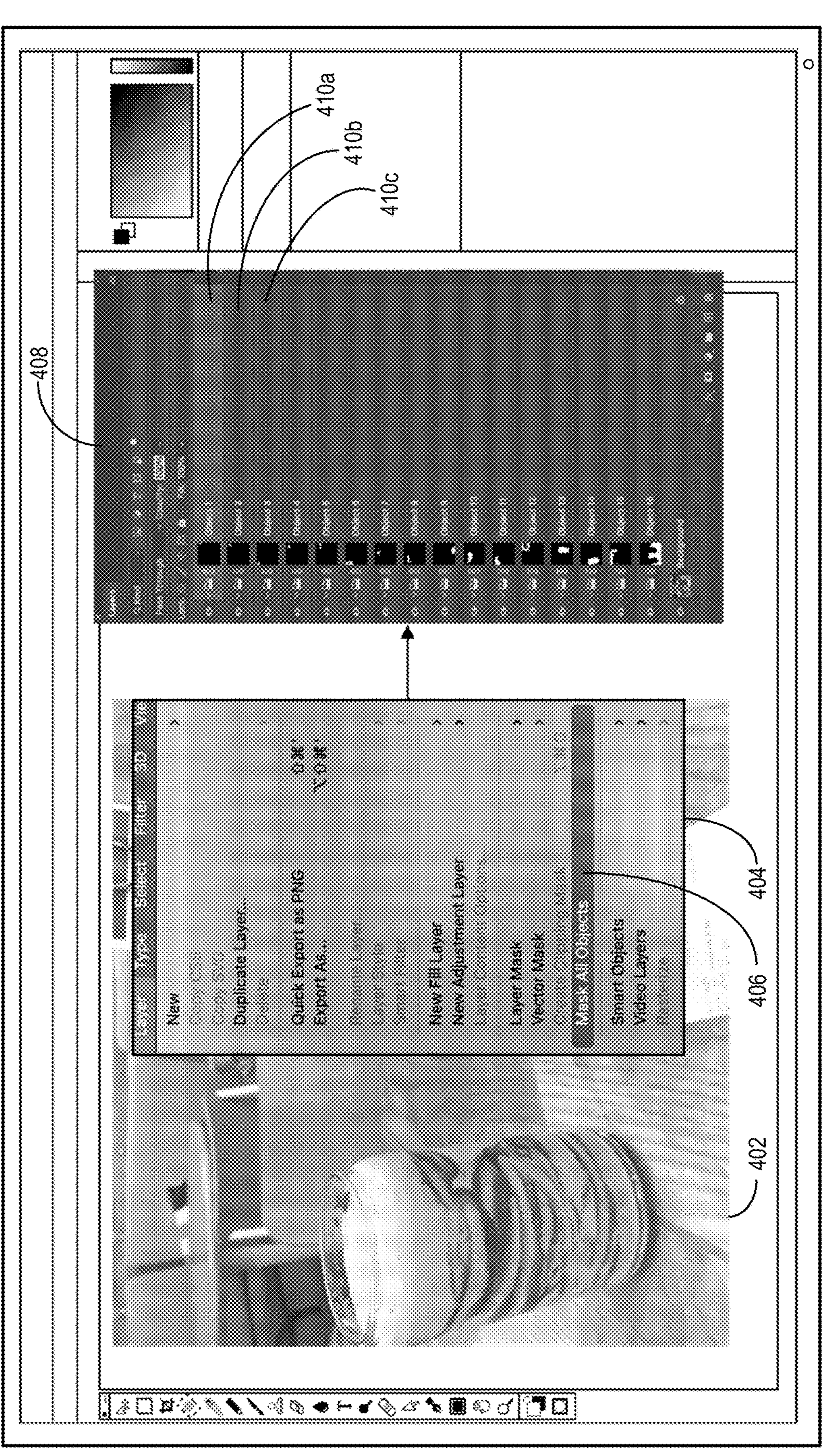
FIG. 4 illustrates an overview of a process of selecting an option to generate refined object masks for all objects in an image in accordance with one or more implementations.

In an alternative implementations, the object mask preview and on-demand generation system 106 generates refined object masks for each object in an image rather than one object at a time. For example, and as shown by FIG. 4, the object mask preview and on-demand generation system 106 receives a request to mask all objects in a digital image. In particular, FIG. 4 illustrates that the object mask preview and on-demand generation system 106 provides an option 406 to mask all objects in a menu 404. In response to a selection of the option 406, the object mask preview and on-demand generation system 106 converts the preliminary object masks for each object in the digital image 402 to a corresponding refined object mask as described herein. The graphical user interface element 408 illustrates how the object mask preview and on-demand generation system 106 creates, in one or more implementations, a separate layer 410*a*, 410*b*, 410*c*, etc. for each refined object mask.

Figure 5A:
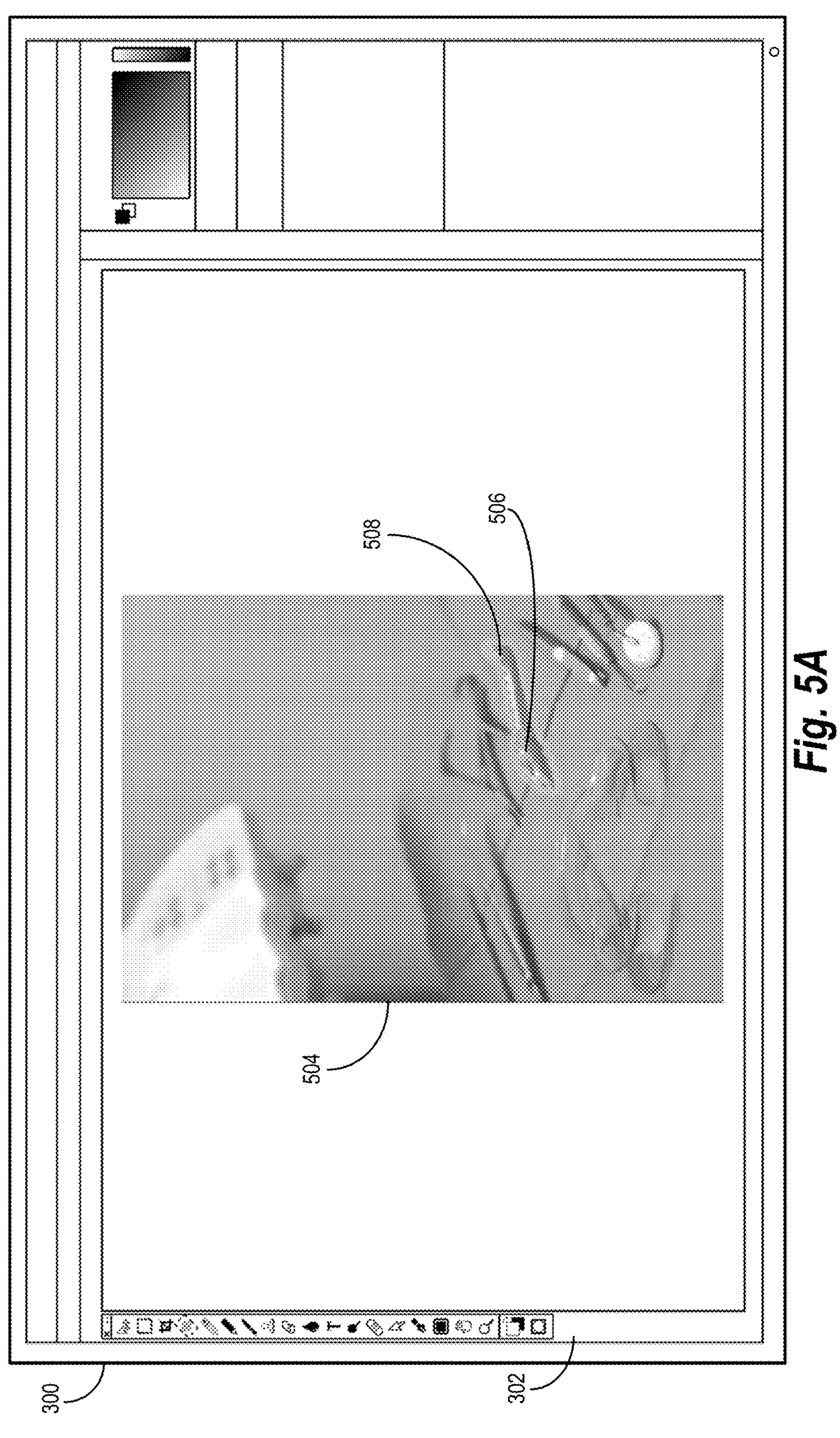
FIGS. 5A-5C illustrates graphical user interfaces showing a process of revising an object mask preview based on user input in accordance with one or more implementations.
Figure 5B:
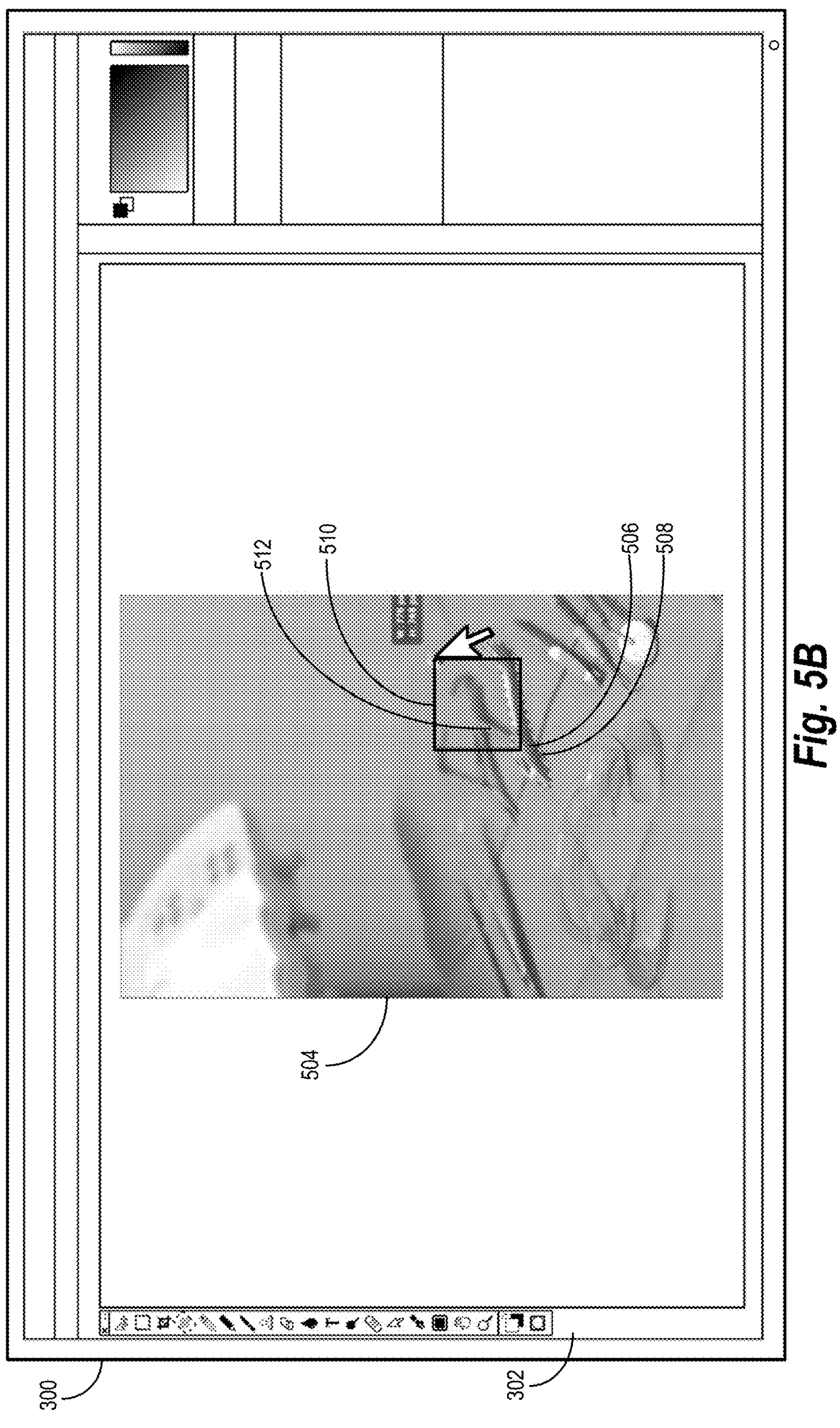
Figure 5C:
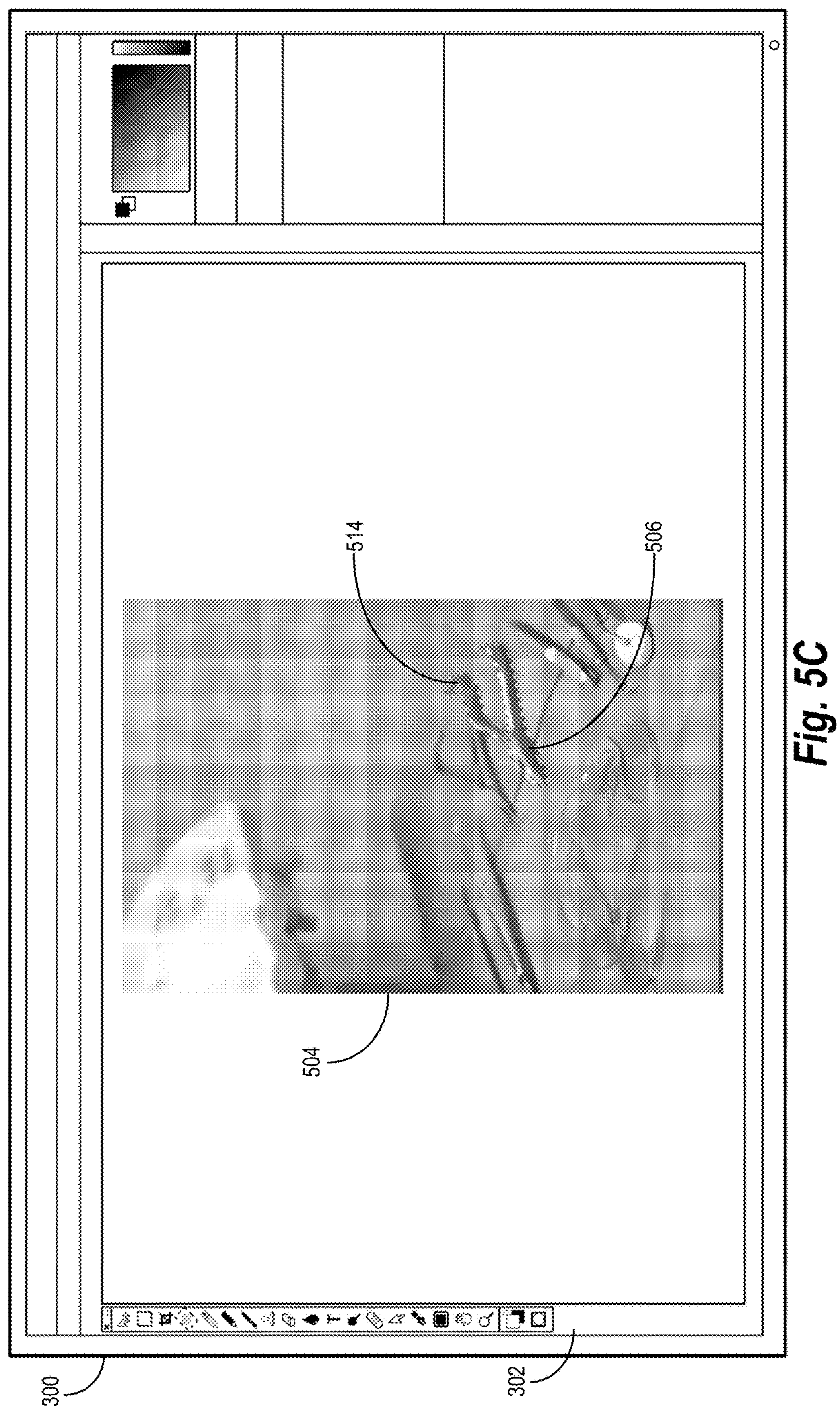

As mentioned above, the object mask preview and on-demand generation system 106 attempts to use minimal computer processing to generate the preliminary object masks. Because of the efficient neural networks and processes used to generate the low preliminary object masks, it is not impossible for the object mask preview and on-demand generation system 106 to make minor errors. For example, FIG. 5A illustrates that the preliminary object mask 508 for a given set of pliers 506 on a surgical table only includes part of the pliers. The object mask preview and on-demand generation system 106 allows for user input to revise preliminary object masks. For example, as illustrated by FIG. 5B, with the preliminary object mask 508 selected, a user can draw or indicate a loose boundary 510 (e.g., a bounding box) around any portion 512 of the object not captured by the original preliminary object mask 508. In response to detecting such user input, as shown by FIG. 5C, the object mask preview and on-demand generation system 106 automatically revises the preliminary object mask 508 of the pliers 506 to include the previously un-included portion 512 thereby generating a merged preliminary object mask 514. Along similar lines, the object mask preview and on-demand generation system 106 will merge preliminary object masks of two or more objects in response to similar user input.

As mentioned above, the object mask preview and on-demand generation system 106 utilizes a panoptic segmentation model 108 to both detect and generate low-resolution object masks for any objects in an image. Object detection and instance segmentation are two important computer vision tasks whose respective goals are to localize the (one or more) objects present in the input image and to generate the masks individually for those objects. These two tasks are part of an automated and effort-free object-centric mask selection in image editing applications such as Photoshop which typically run on personal computers and desktop machines. However, conventional object detection and instance segmentation models are relatively computationally expensive and they are not suited for on-device inference. In one or more implementations, the object mask preview and on-demand generation system 106 utilizes a panoptic segmentation model 108 that is an on-device friendly model that effectively handles both object detection and instance segmentation. For the image editing applications that allow users to select object masks in the images, the generalization and accuracy strengths of the model are as equally important as its computational efficiency. Furthermore, the panoptic segmentation model 108 avoids predicting many false negatives (missed the objects of interest) and many false positives (mistreating non-objects as objects), and/or poor-quality object masks.

Figure 6:
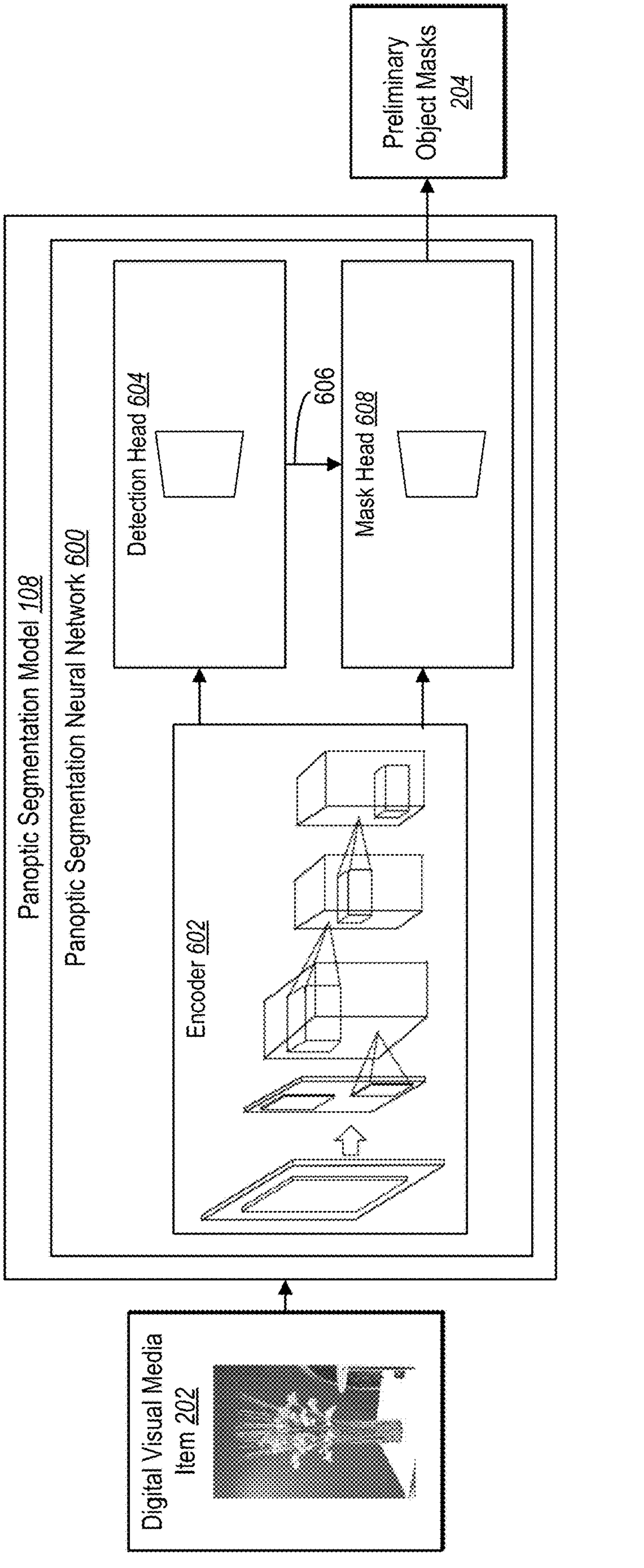
FIG. 6 illustrates a panoptic segmentation model generating preliminary object masks in accordance with one or more implementations.

As shown by FIG. 6, panoptic segmentation model 108 comprises a panoptic segmentation neural network 600 in one or more implementations. The panoptic segmentation neural network 600 includes a backbone network or encoder 602, a detection head (or neural network decoder detection head) 604, and a mask head (or neural network decoder masking head) 164. The encoder 602 extracts features form the a downscaled digital image (or an image of a predetermined resolution). The detection head 604 detects all objects in the digital image based on the encoded features from the encoder by generating bounding boxes 606 with a classification score of the object in the bounding box's objectness (i.e., how confident the detection head is that what is in the bounding box is an object). The mask head 608 uses a given bounding box 606 from the detection head 604 and features from the encoder 602 to generate preliminary object masks 204. The encoder/backbone 602, in one or more implementations, is carefully designed for on-device inference and has a smaller computational footprint than conventional large models like ResNet-50. Previously incorporated U.S. No. 63/271,147 includes additional details of an example panoptic segmentation neural network 600 (i.e., DOMO).

In alternative implementations, the panoptic segmentation neural network 600 includes another object instance segmentation head or model such as the techniques and approaches found in Ning Xu et al., "Deep GrabCut for Object Selection," published Jul. 14, 2017, the entirety of which is incorporated herein by reference; the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

One or more implementations described herein include an object mask refinement model 110 that utilizes a neural network that includes an iterative or recursive decoder for flexible and accurate object mask upscaling and refinement. Indeed, in one or more implementations, the object mask refinement model 110 generates an upscaled and refined object mask for a digital image (or other digital image) using a segmentation refinement neural network having a recursive decoder that incorporates hierarchical patch refinements and recursive global refinements under an internal unsupervised spatial guidance. In particular, in some cases, the recursive decoder integrates recursive mask-wise global refinements coupled with a hierarchy of patch modules (e.g., hierarchical point-wise refining blocks) to iteratively improve the quality of object masks in higher resolutions. In some instances, the segmentation refinement neural network receives a low-resolution object mask and recovers/refines details while upscaling to an original or otherwise higher resolution.

Figure 7:
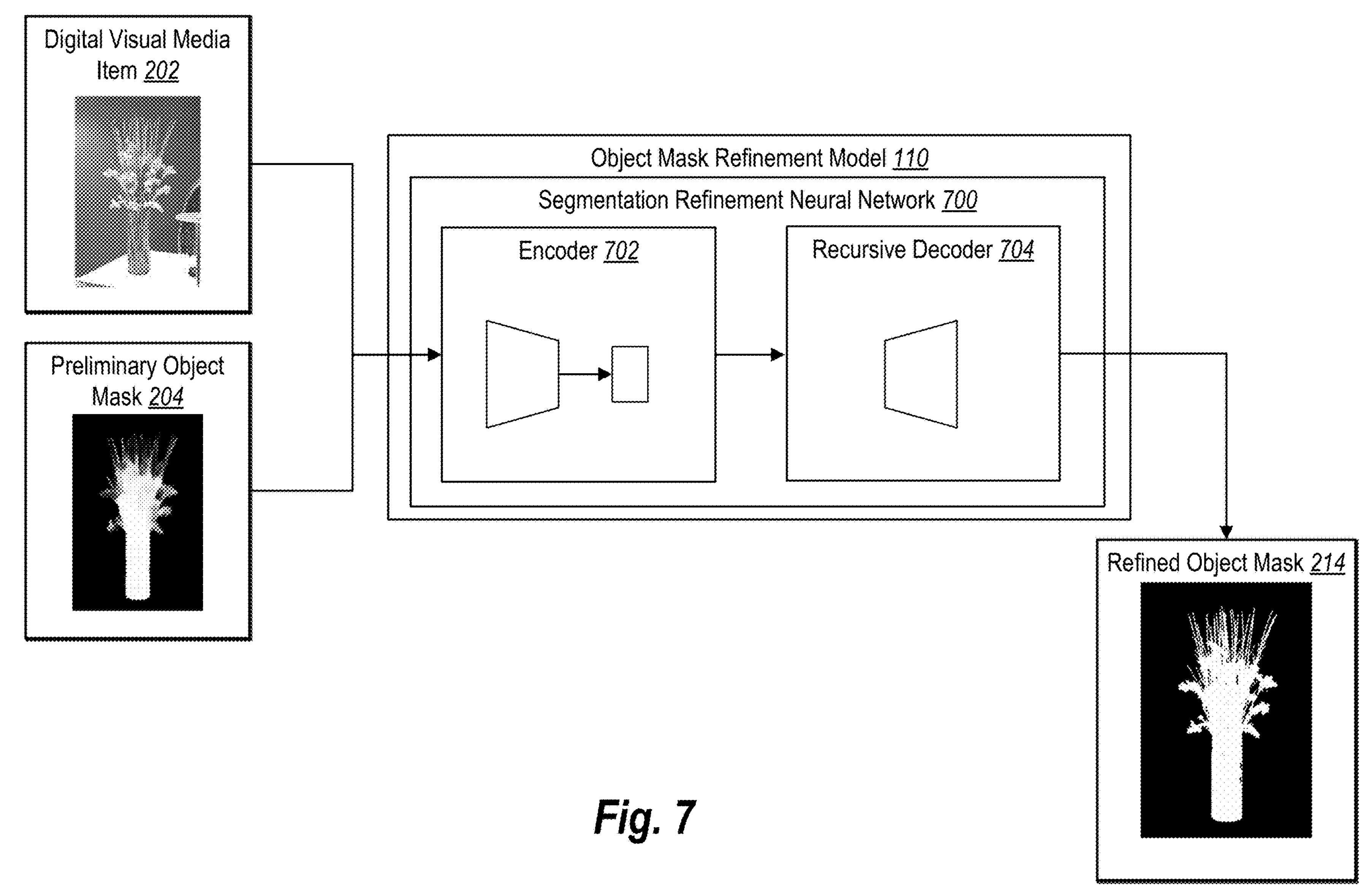
FIG. 7 illustrates an object mask refinement model generating a refined object mask from a preliminary object mask in accordance with one or more implementations.

To provide an illustration, as shown by FIG. 7, in one or more implementations, the object mask refinement model 110 generates, utilizing a segmentation refinement neural network 700, an upscaled and refined object mask 214 for a digital visual media item 202 depicting one or more objects from a preliminary object mask 204. For example, in some implementations, the object mask refinement model 110 utilizes a segmentation refinement neural network having an encoder-decoder network architecture. To illustrate, in some instances, the segmentation refinement neural network includes an encoder 702 and a recursive decoder 704. Accordingly, the object mask refinement model 110 utilizes the encoder 702 to generate various encoded feature maps corresponding to the preliminary object mask 204 and the digital image 202 and utilizes the recursive decoder 704 to generate the upscaled and refined object mask based on the encoded feature maps.

Figure 8:
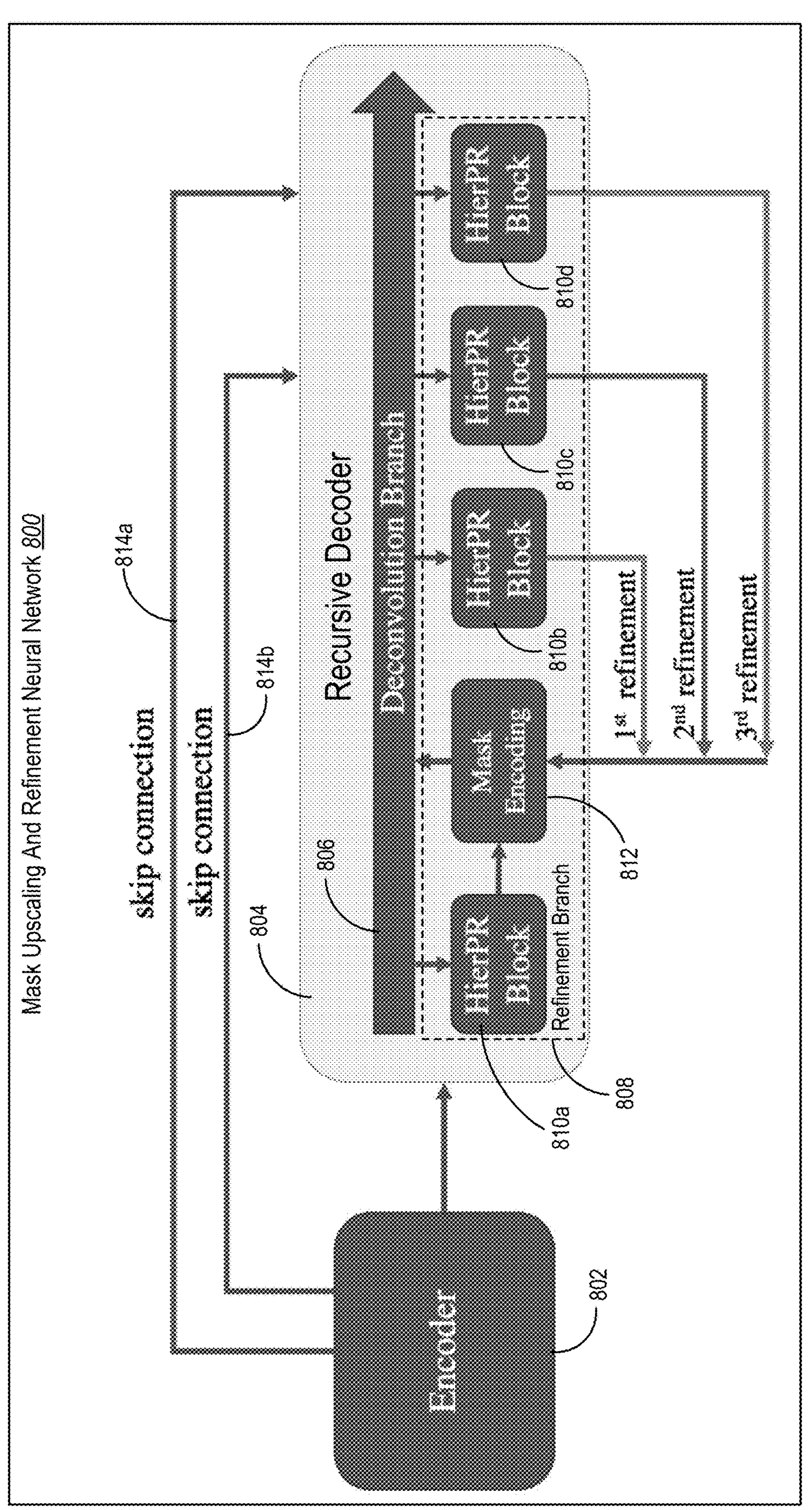
FIG. 8 illustrates details of a network architecture of a segmentation refinement neural network in accordance with one or more implementations.

In some implementations, the recursive decoder 704 includes a deconvolution branch and a refinement branch as described in relation to FIG. 8. In some cases, the object mask refinement model 110 utilizes the deconvolution branch to generate one or more decoded feature maps corresponding to the digital image based on the encoded feature maps. Further, the object mask refinement model 110 utilizes the refinement branch to generate an upscaled and refined object mask 214 for the digital image based on the decoded feature maps and the encoded feature maps. For example, in some implementations, the object mask refinement model receives the preliminary object mask 204 and recursively refines the preliminary object mask 204 using the refinement branch.

In some implementations, the refinement branch generates the upscaled and refined object mask 214 via a hierarchy of hierarchical point-wise refining blocks. To illustrate, in some cases, the object mask refinement model 110 further utilizes a plurality of additional hierarchical point-wise refining blocks to generate the upscaled and refined object mask 214 by recursively refining the preliminary object mask 204. In some cases, the additional hierarchical point-wise refining blocks make up a multi-cycle up-sampling process that up-samples the preliminary object mask 204 while refining the preliminary object mask 204.

In some implementations, the object mask refinement model 110 generates an uncertainty map that identifies pixels having an associated uncertainty whether or not the pixels correspond to the object of the preliminary object mask to be refined. In such implementations, the object mask refinement model 110 utilizes each hierarchical point-wise refining block to refine the preliminary object mask 204 based on the respective uncertainty map by refining the uncertain areas of the preliminary object mask 204. The uncertainty map provides guidance to the areas of a preliminary object mask 204 to be refined. Thus, by utilizing the uncertainty map, the object mask refinement model 110 limits computational costs by avoiding the refinement of every pixel/location of a preliminary object mask 204.

The object mask refinement model 110 provides several advantages over conventional systems. For example, the object mask refinement model 110 operates more flexibly than conventional systems. In particular, the object mask refinement model 110 flexibly adapts to generate upscaled and refined object masks 214 for high-resolution digital images (e.g., digital images having a resolution between 2K and 4K). For example, by utilizing a recursive decoder that includes a deconvolution branch and a refinement branch having a hierarchy of hierarchical point-wise refining blocks, the object mask refinement model 110 flexibly improves upon the level of detail represented in preliminary object mask 204 generated for digital images. Indeed, the object mask refinement model 110 generates upscaled and refined object masks 214 having a high resolution (e.g., the original resolution associated with the digital image) from initial low-resolution preliminary object masks 204.

Additionally, the object mask refinement model 110 improves the accuracy of object masks generated for digital images—particularly those digital images having a high resolution. Indeed, by improving the level of detail represented within generated object masks, the object mask refinement model 110 generates object masks (e.g., upscaled and refined object masks) that more accurately distinguish an object portrayed in a digital image from a background or other objects. Accordingly, the object mask refinement model 110 generates more accurate object masks for high-resolution digital images where fine-grained details associated with complex object boundaries are more apparent.

In one or more implementations, an upscaled and refined object mask 214 comprises an object mask generated based on another object mask, such as preliminary object mask 204 or a preceding upscaled and refined object mask. In particular, in some instances, an upscaled and refined object mask 214 includes an object mask having pixels that have been re-analyzed or re-classified to indicate whether or not those pixels belong to an object portrayed in the digital image. For example, in some implementations, an upscaled and refined object mask 214 includes an object mask having one or more pixels that were indicated, in a previous object mask, as being uncertain as to whether or not they belong to an object but have since been determined to belong or not belong to an object with a greater certainty.

The object mask refinement model 110 optionally utilizes a patch-based refinement process based on the digital visual media item 202 utilizing the segmentation refinement neural network 700 to generate a refined upscaled object mask 214. To illustrate, in some implementations, the object mask refinement model 110 determines one or more patches corresponding to the full resolution digital visual media item 202. In one or more implementations, a patch includes a portion of a digital image that includes less than the entirety of the full resolution digital visual media item 202. In some implementations, a patch includes a resolution that corresponds to the original resolution associated with the full resolution digital visual media item 202. For example, in one or more implementations, a patch includes a number of pixels included in the corresponding portion of the full resolution digital visual media item 202 at the original resolution. In other words, in some cases, a patch includes a fractional portion of a digital image and also includes a corresponding fraction of the pixels represented by the full resolution digital image at the original resolution.

Accordingly, in some implementations, the object mask refinement model 110 utilizes the segmentation refinement neural network 700 to generate the refined object mask 214 based on the preliminary object mask 204 and the one or more patches corresponding to the full resolution digital visual media item 202. For example, in some implementations, the object mask refinement model 110 utilizes the segmentation refinement neural network 400 to refine a portion of the preliminary object mask 204 based on a patch of the digital visual media item 202 corresponding to that portion. The object mask refinement model 110 further utilizes the segmentation refinement neural network 700 to refine an additional portion of the preliminary object mask 204 based on another patch that corresponds to that additional portion. Thus, the object mask refinement model 110 utilizes the one or more patches to recover details in the original resolution associated with the full resolution digital visual media item 202.

As discussed above, in one or more implementations, the object mask refinement model 110 comprises a mask upscaling and refinement neural network having an encoder-decoder network architecture. For example, FIG. 8 illustrates an encoder-decoder network architecture of a mask upscaling and refinement neural network 800 in accordance with one or more implementations. As shown in FIG. 8, a mask upscaling and refinement neural network 800 includes an encoder 802. The encoder 802 can include various network/encoder architectures. For example, in some implementations, the encoder 802 includes a feature extraction network. For example, in one or more implementations, the encoder 802 includes a convolutional neural network. In some implementations, the encoder 802 further includes a neural network backbone. For example, in some cases, the encoder 802 includes a residual neural network backbone. In some implementations, the encoder 802 includes a mobile neural network backbone.

For example, in one or more implementations, the encoder 802 comprises includes at least one of the convolutional neural network architectures described in U.S. Pat. No. 10,460,214, entitled Deep Salient Conventional Neural Networks For Efficient Digital Object Segmentation, filed on Oct. 31, 2017, which is incorporated herein by reference in its entirety. In still further implementations, the encoder 802 comprises the backbone neural network described in U.S. patent application Ser. No. 16/988,408, entitled Generating Upscaled and Refined Object Masks Based On Uncertain Pixels, filed on Aug. 7, 2020, which is incorporated herein by reference in its entirety. In still further implementations, the encoder 802 comprises the encoder described by Zhao et al., in Pyramid scene parsing network, In Proceedings of the IEEE conference on computer vision and pattern recognition, pages 2881-2890, 2017, which is incorporated herein by reference in its entirety. In such implementations, the encoder 802 optionally comprises ResNet50 and MobileNetV3 backbones as described, respectively, by He et al. in Deep Residual Learning For Image Recognition In Proceedings of the IEEE conference on computer vision and pattern recognition, pages 770-778, 2016, and Howard et al., in Searching For Mobilenetv3, In Proceedings of the IEEE International Conference on Computer Vision, pages 1314-1324, 2019, each of which are hereby incorporated by reference in their entirety.

In one or more implementations, the object mask refinement model 110 utilizes the encoder 802 to extract encoded feature maps from a digital image. In one or more implementations, a feature map generally includes a set of numerical values representing features utilized by a neural network, such as a mask upscaling and refinement neural network. To illustrate, in some instances, a feature map includes a set of values corresponding to latent and/or patent attributes and characteristics of an input analyzed by a neural network (e.g., a digital image). In one or more implementations, an encoded feature map includes a feature map generated by an encoder of a neural network. For example, in some cases, an encoded feature map includes a set of encoded values corresponding to latent and/or patent attributes and characteristics of an input analyzed by the neural network or, more specifically, the encoder (e.g., a digital image). In contrast, in one or more implementations, a decoded feature map includes a feature map generated by a decoder of a neural network. For example, in some cases, a decoded feature map includes a set of decoded values corresponding to latent and/or patent attributes and characteristics of an input analyzed by the neural network or, more specifically, the decoder.

As further shown in FIG. 8, the mask upscaling and refinement neural network 800 also includes a recursive decoder 804. In one or more implementations, a recursive decoder 804 includes a neural network decoder that generates an output using a recursive process. In particular, in one or more implementations, a recursive decoder 804 includes a neural network decoder that generates an upscaled and refined object mask corresponding to a digital image using a recursive process. For example, in some implementations, a recursive decoder 804 includes a neural network decoder that generates an object mask based on an input to the recursive decoder (e.g., a digital image or a low-resolution object mask corresponding to the digital image) and iteratively refines the object mask (e.g., generates upscaled and refined object masks).

As shown in FIG. 8, the recursive decoder 804 includes a deconvolution branch 806. In one or more implementations, a deconvolution branch includes a component of a mask upscaling and refinement neural network that generates decoded feature maps. In particular, in some implementations, a deconvolution branch includes one or more deconvolutional layers of a recursive decoder of a mask upscaling and refinement neural network 800 that generates decoded feature maps. For example, in some implementations, a deconvolution branch 806 includes one or more deconvolutional layers that generate decoded feature maps based on inputs to the deconvolution branch.

Indeed, in one or more implementations, the object mask refinement model 110 utilizes the deconvolution branch 806 of the recursive decoder 804 to generate a plurality of decoded feature maps. For example, in some implementations, the object mask refinement model 110 utilizes the deconvolution branch 806 to generate one or more decoded feature maps based on one or more of the encoded feature maps generated by the encoder 802. In some implementations, the object mask refinement model 110 utilizes the deconvolution branch 806 to generate one or more decoded feature maps further based on values (e.g., encodings of coarse-to-fine variations) generated by the refinement branch 808 of the recursive decoder 804.

In one or more implementations, the object mask refinement model 110 utilizes the deconvolution branch 806 to recover the resolution of feature maps with respect to the input of the mask upscaling and refinement neural network 800. In particular, in some cases, the object mask refinement model 110 utilizes the deconvolution branch 806 to gradually increase the resolution of the decoded feature maps. For example, in some implementations, the object mask refinement model 110 utilizes the deconvolution branch 806 to implement a gradually decreasing stride when generating the decoded feature maps (strides of 8, 8, 4, and 2 as one example implementation).

As shown in FIG. 8, and as suggested above, the recursive decoder 804 further includes a refinement branch 808. In one or more implementations, a refinement branch includes a component of a mask upscaling and refinement neural network that generates and refines object masks. In particular, in some implementations, a refinement branch includes a component of a recursive decoder of a mask upscaling and refinement neural network that generates and refines object masks. For example, in some cases, a refinement branch generates an object mask corresponding to an input of the mask upscaling and refinement neural network and recursively refines the object mask (e.g., by generating subsequent upscaled and refined object masks).

In one or more implementations, the object mask refinement model 110 utilizes the refinement branch 808 to generate and refine an object mask. For example, in one or more implementations, the object mask refinement model 110 utilizes the refinement branch to generate and refine an object mask based on the decoded feature maps generated by the deconvolution branch 806. In some instances, the object mask refinement model 110 utilizes the refinement branch 808 to generate and refine an object mask further based on encoded feature maps generated by the encoder 802. In some implementations, the object mask refinement model 110 utilizes the refinement branch 808 to generate and refine an object mask further based on other outputs, such as those generated by components of the refinement branch 808 are described in previously incorporated by reference U.S. Provisional Patent Application No. 63/271,147.

In some implementations, the object mask refinement model 110 utilizes the refinement branch 808 to refine the coarse outputs from the deconvolution branch 806 (e.g., the decoded feature maps). In some implementations, the object mask refinement model 110 utilizes the refinement branch 808 to refine an averaged combination of outputs from both branches. In some cases, the object mask refinement model 110 utilizes the refinement branch 808 to perform point-wise refinements, as will be discussed below. Further, as will be discussed below, the object mask refinement model 110 utilizes the refinement branch 808 to implement relatively lower strides than the deconvolution branch 806 (e.g., strides 4, 4, 2, and 1 as one example implementation).

As shown in FIG. 8, the refinement branch 808 of the recursive decoder 804 includes hierarchical point-wise refining blocks 810*a*-810*d*. In one or more implementations, a hierarchical point-wise refining block includes a component of a mask upscaling and refinement neural network that generates an iteration of an object mask. In particular, in some implementations, a hierarchical point-wise refining block includes a point-wise processing unit of a recursive decoder of a mask upscaling and refinement neural network that generates an object mask based on various inputs to the hierarchical point-wise refining block. In some implementations, a hierarchical point-wise refining block generates an object mask (e.g., an upscaled and refined object mask) that includes refinements to an object mask generated by a previous hierarchical point-wise refining block.

Further, as shown in FIG. 8, the refinement branch 808 of the recursive decoder 804 also includes a mask encoding layer 812. In one or more implementations, a mask encoding layer includes a component of a mask upscaling and refinement neural network that generates encodings of coarse-to-fine variations. In particular, in some implementations, a mask encoding layer includes a component of a recursive decoder of a mask upscaling and refinement neural network that generates coarse-to-fine variations between object masks For example, in some cases, a mask encoding layer generates encodings of coarse-to-fine variations based on a pair of object masks.

In one or more implementations, coarse-to-fine variations include differences between object masks. In particular, in some implementations, coarse-to-fine variations include differences between the segmentation represented in different object masks based on a difference in resolutions of the object masks. For example, in some implementations, coarse-to-fine variations include differences based on a first object mask providing a more detailed segmentation when compared to a second object mask due to the first object mask having a higher resolution than the second object mask.

Indeed, as shown in FIG. 8, the object mask refinement model 110 provides one or more decoded feature maps generated by the deconvolution branch 806 to each of the hierarchical point-wise refining blocks 810*a*-810*d*. As will be discussed more below, the object mask refinement model 110 utilizes the hierarchical point-wise refining blocks 810*a*-810*d* to generate object masks as output. In particular, the object mask refinement model 110 utilizes the hierarchical point-wise refining block 810*a* to generate an initial object mask and further utilizes the hierarchical point-wise refining blocks 810*b*-810*d* to refine the object mask (e.g., generate upscaled and refined object masks).

Though, FIG. 8 illustrates each of the hierarchical point-wise refining blocks 810*a*-810*d* as a single block, it should be understood that one or more of the hierarchical point-wise refining blocks 810*a*-810*d* include multiple hierarchical point-wise refining blocks in some implementations. Further, as will be discussed below, in some cases, the hierarchical point-wise refining blocks 810*a*-810*d* make up a hierarchy of hierarchical point-wise refining blocks. For example, in some implementations, the hierarchical point-wise refining blocks 810*a* includes a first hierarchical point-wise refining block for generating an initial object mask, and the hierarchical point-wise refining blocks 810*b*-810*d* implement a three-cycle up-sampling process that recursively up-samples the initial object mask while recursively refining the initial object mask.

As shown in FIG. 8, the object mask refinement model 110 provides the object masks generated by the hierarchical point-wise refining blocks 810*a*-810*d* to the mask encoding layer 812. Further, the object mask refinement model 110 provides the encodings of the coarse-to-fine variations generated by the mask encoding layer 812 back to the deconvolution branch 806. Accordingly, in some implementations, the object mask refinement model 110 utilizes the deconvolution branch 806 to generate at least some of the decoded feature maps based on the encodings of the coarse-to-fine variations.

As further shown in FIG. 8, the mask upscaling and refinement neural network 800 further includes the skip connections 814*a*-814*b*. In one or more implementations, the object mask refinement model 110 utilizes the skip connections 814*a*-814*b* to provide feature values generated by components positioned early in the mask upscaling and refinement neural network 800 to components positioned later in the mask upscaling and refinement neural network 800. In one or more implementations, a feature value includes a numerical value generated by a component of a neural network, such as a mask upscaling and refinement neural network. In particular, in some instances, a feature value includes a value that corresponds to one or more latent and/or patent attributes and characteristics of an input analyzed by a neural network or neural network component. In one or more implementations, a feature value includes a low-level feature value that corresponds to one or more low-level (e.g., patch) attributes and characteristics of an input analyzed by a neural network or neural network component. Additionally, in some cases, a feature value includes a high-level feature value that corresponds to one or more high-level (e.g., global or regional) attributes and characteristics of an input analyzed by a neural network or neural network component.

Though two skip connections are shown, it should be understood that, in some implementations, the mask upscaling and refinement neural network 800 includes fewer or additional skip connections. For example, in some implementations, the mask upscaling and refinement neural network 800 includes a first set of skip connections connecting the last two deconvolutional of the deconvolution branch 806 to the hierarchical point-wise refining block 810*a* and the first convolutional layer of the encoder 802 and a second set of skip connections connecting the hierarchical point-wise refining blocks 810*b*-810*d* to the hierarchical point-wise refining block 810*a*. Indeed, various additional configurations are possible.

In one or more implementations, the feature values passed via the skip connections are relatively low-value (e.g., more patch) when performing refinements with a relatively high stride. In contrast, in some implementations, the feature values passed via the skip connections are relatively high-level (e.g., more global) when performing refinements with a relatively low stride. In some implementations, by using a skip connection configuration as discussed above, the object mask refinement model 110 adaptively provides detail information at low resolution and semantic guidance at high resolution.

While FIG. 8 describes that the object mask refinement model 110 comprising a mask upscaling and refinement neural network 800, in alternative implementations, the object mask refinement model 110 comprises another neural network, such as the segmentation refinement neural network 700 of FIG. 7. In another implementation, the object mask refinement model 110 comprises a segmentation refinement neural network as described in U.S. patent application Ser. No. 16/988,408, filed on Aug. 7, 2020 and entitled "GENERATING REFINED SEGMENTATION MASKS BASED ON UNCERTAIN PIXELS."

Thus, the approach of the object mask refinement model 110 described in relation to FIGS. 7-8 leverages a low-resolution object mask, enhances the low-resolution object mask, and fuses the unsampled low resolution result with a patch-by-patch refined result to generate an improved high-resolution object mask. This approach provides better results than the naïve approach of performing patch-by-patch refinement of an upscaled low-resolution object mask that suffers from lack of overall image information. Furthermore, the approach of the object mask refinement model 110 allows for generation of an object mask of arbitrary resolution from a low-resolution object mask.

Figure 9:
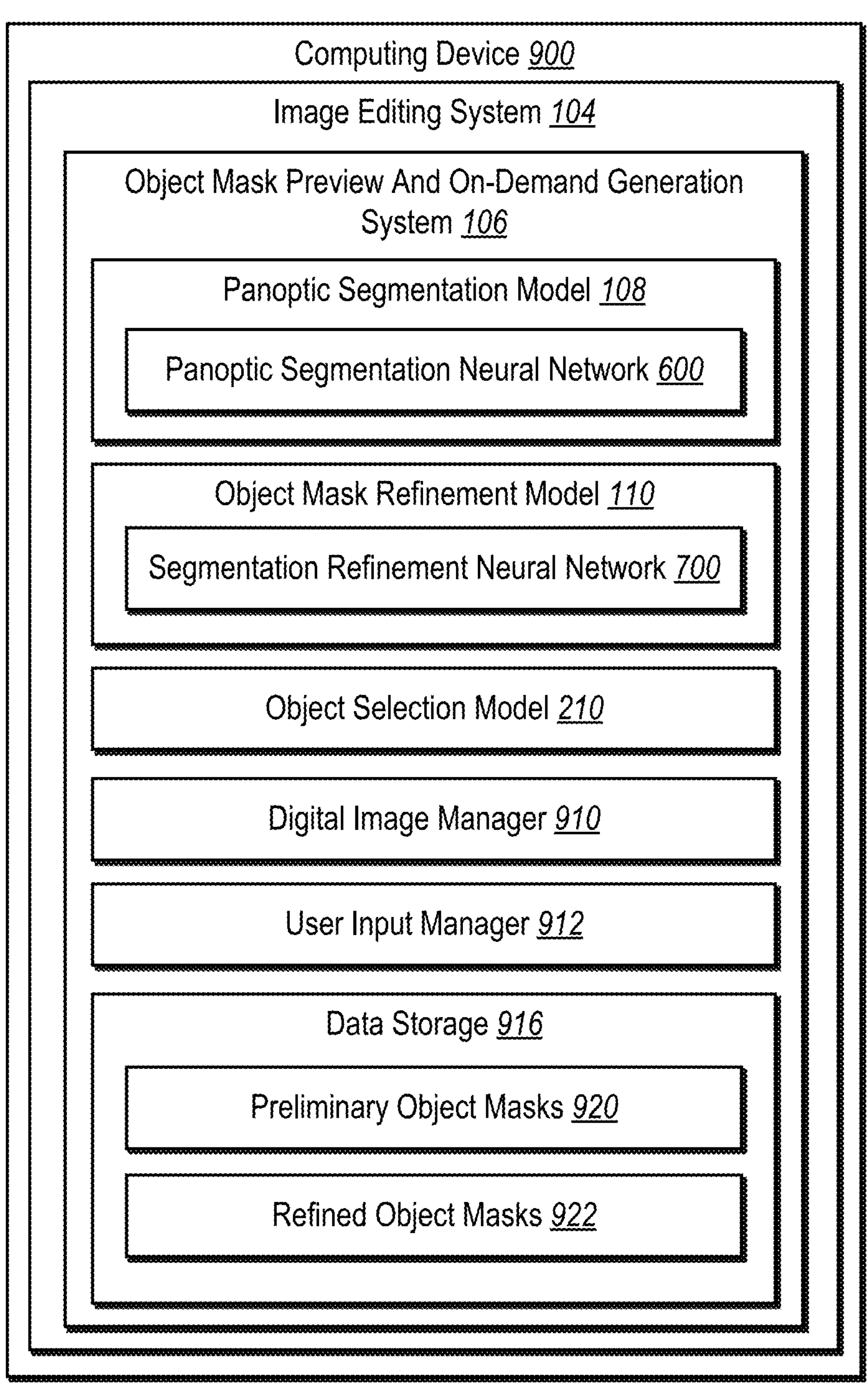
FIG. 9 illustrates an example schematic diagram of an object mask preview and on-demand generation system in accordance with one or more implementations.

Referring now to FIG. 9, additional detail is provided regarding the capabilities and components of the object preview and on-demand generation system 106 in accordance with one or more implementations. In particular, FIG. 9 shows a schematic diagram of an example architecture of the object preview and on-demand generation system 106 implemented within the image editing system 104 and executed on a computing device 900.

As shown, the object preview and on-demand generation system 106 is located on a computing device 900 within an image editing system 104. In general, the computing device 900 may represent various types of client devices. For example, in some implementations, the client is a mobile device, such as a laptop, a tablet, a mobile telephone, a smartphone, etc. In other implementations, the computing device 900 is a non-mobile device, such as a desktop or server, or another type of client device. Additional details with regard to the computing device 900 are discussed below as well as with respect to FIG. 12.

As illustrated in FIG. 9, the object preview and on-demand generation system 106 includes various components for performing the processes and features described herein. For example, the object preview and on-demand generation system 106 includes the panoptic segmentation model 106, the object mask refinement model 110, the object selection model 210, a digital image manager 910, a user input manager 912, and a data storage 916. As shown, the data storage 916 includes preliminary object masks 920 and refined object masks 922. Each of the components mentioned above is described below in turn.

The panoptic segmentation model 106 generates preliminary object masks 920 as described above. In one or more implementations, the panoptic segmentation model 106 comprises the panoptic segmentation neural network 600. The object mask refinement model 110 generates refined object masks 922 from the preliminary object masks 920 as described above. In one or more implementations, the object mask refinement model 110 comprises the segmentation refinement neural network 700. The object preview and on-demand generation system 106 also includes the object selection model 210 as described above.

The object preview and on-demand generation system 106 includes the digital image manager 910. In general, the digital image manager 910 facilitates identifying, accessing, receiving, obtaining, generating, importing, exporting, copying, modifying, removing, and organizing digital images. In one or more implementations, the digital image manager 910 operates in connection with an image editing system 104 (e.g., an image editing application) to access and edit images, as described previously. In some implementations, the digital image manager 910 communicates with the data storage 916 to store and retrieve the digital images, for example, within a digital image database of the data storage 916.

As shown, the object preview and on-demand generation system 106 includes the user input manager 912. In various implementations, the user input manager 912 is configured to detect, receive, and/or facilitate user input on the computing device 900. In some instances, the user input manager 912 detects one or more user interactions (e.g., a single interaction, or a combination of interactions) with respect to a digital image or object mask in a user interface. For example, the user input manager 912 detects a user interaction from a keyboard, mouse, touchpad, touchscreen, and/or any other input device in connection with the computing device 900. For instance, the user input manager 912 detects user input with respect to a selection request of a target object or partial object, a hover or touch over an object, or selection of a preliminary object mask 920.

Each of the components of the object preview and on-demand generation system 106 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the object preview and on-demand generation system 106 causes a computing device to perform object mask generation and surfacing as described herein. Alternatively, the components optionally include hardware, such as a special-purpose processing device to perform a certain function or group of functions. In addition, the components of the object preview and on-demand generation system 106 optionally includes a combination of computer-executable instructions and hardware.

Furthermore, the components of the object preview and on-demand generation system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, PHOTOSHOP MOBILE, or other digital content applications software packages. The foregoing are either registered trademarks or trademarks of Adobe Inc. in the United States and/or other countries.

FIGS. 1-9, the corresponding text, and the examples provide several different methods, systems, devices, and non-transitory computer-readable media of the object preview and on-demand generation system 106. In addition to the foregoing, one or more implementations are described in terms of flowcharts comprising acts for accomplishing a particular result, such as the flowcharts of acts shown in FIGS. 10-11. Additionally, the acts described herein may be repeated or performed in parallel with one another or parallel with different instances of the same or similar acts.

Figure 10:
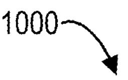
FIG. 10 illustrates a flowchart of a series of acts for generating and surfacing preliminary object masks in accordance with one or more implementations.
Figure 10:
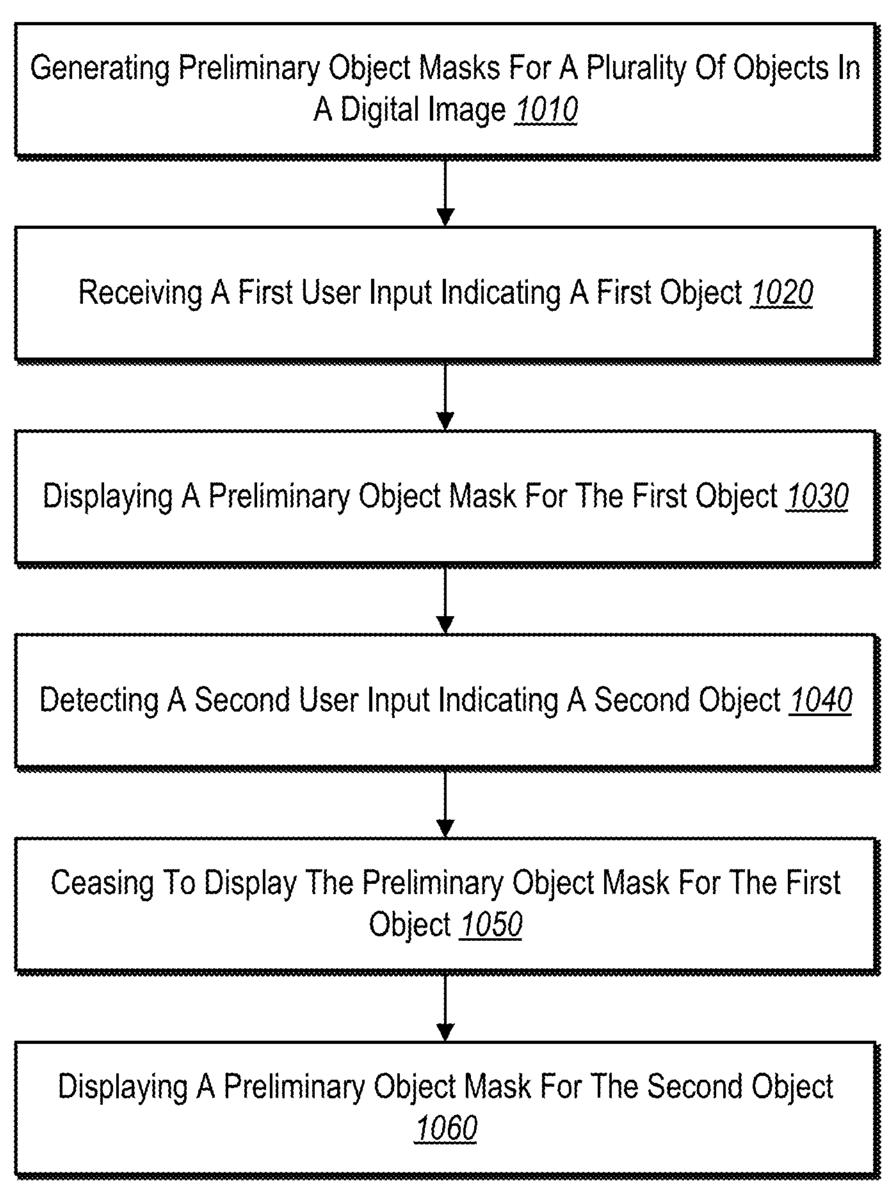
Figure 11:
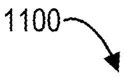
FIG. 11 illustrates a flowchart of a series of acts for generating preliminary object masks and on-demand refined object masks in accordance with one or more implementations.
Figure 11:
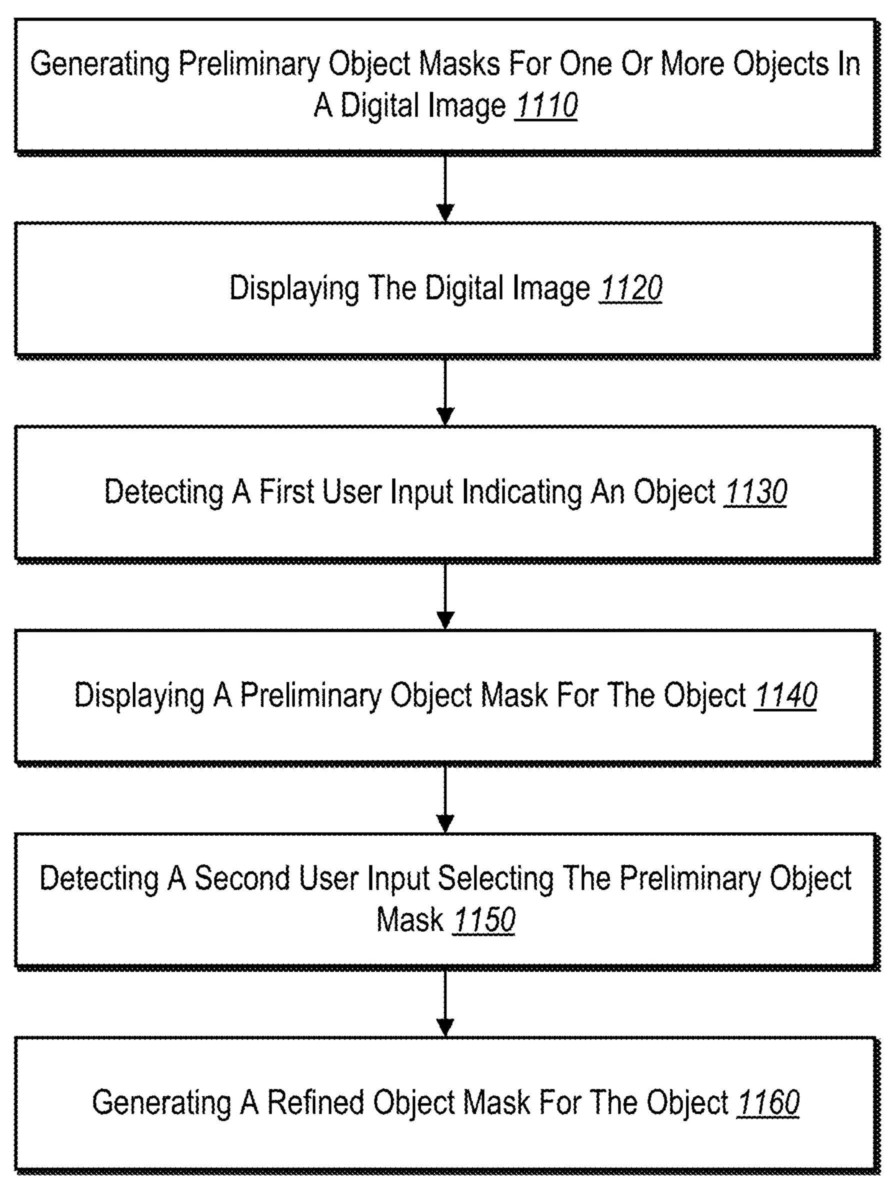

As mentioned, FIGS. 10-11 illustrates a flowchart of a series of acts in accordance with one or more implementations. While FIGS. 10-11 illustrates acts according to one or more implementations, alternative implementations may omit, add to, reorder, and/or modify any of the acts shown. The acts of FIGS. 10-11 are optionally performed as part of a method. Alternatively, a non-transitory computer-readable medium comprises instructions that, when executed by one or more processors, cause a computing device to perform the acts of FIGS. 10-11. In some implementations, a system is configured to perform the acts of FIGS. 10-11.

To illustrate, FIG. 10 shows a flowchart of a series of acts 1000 of generating and surfacing preliminary object masks in accordance with one or more implementations. In various implementations, the series of acts 1000 is implemented on one or more computing devices, such as the client device 112 or the server(s) 102. In addition, in some implementations, the series of acts 1000 is implemented in a digital environment for creating or editing digital content (e.g., digital images). For example, the series of acts 1000 is implemented on one or more computing devices (e.g., server devices) having memory (or memory devices) that includes objects within a plurality of digital images.

The series of acts 1000 includes an act 1010 of generating preliminary object masks for a plurality of objects in a digital image. For instance, the act 1010 includes receiving a digital image including a plurality of objects. In one or more implementations, the act 1010 includes providing the digital image for display within an image editing application. Act 1010 involves generating the preliminary object masks utilizing a panoptic segmentation neural network on a computing device. Act 1010 also involves detecting objects in the digital image utilizing one or more detection heads of the panoptic segmentation neural network. Act 1010 also involves generating, utilizing a masking head of the panoptic segmentation neural network, a preliminary object mask for each object detected in the digital image. Act 1010 also optionally involves generating initial object masks for the one or more objects utilizing the panoptic segmentation neural network and refining the initial object masks to generate the preliminary object masks utilizing a segmentation refinement neural network. In one or more implementations act 1010 also involves generating preliminary object masks having a lower resolution than the digital image. Act 1010 optionally involves generating the preliminary object masks for the plurality of objects in response to selection of an option to mask all objects in the digital image without further user input.

As shown, the series of acts 1000 also includes an act 1020 of receiving a first user input indicating a first object of the plurality of objects in the digital image. For instance, the act 1020 involves detecting the first user input. In example implementations, the act 1020 involves detecting a hovering pointer over the first object or a touch tap gesture on the first object.

As shown in FIG. 10, the series of acts 1000 further includes an act 1030 of displaying a preliminary object mask for the first object via the graphical user interface. For instance, the act 1030 includes displaying, in response to the first user input, a preliminary object mask for the first object via the graphical user interface. In some implementations, the act 1030 includes displaying the preliminary object mask in a layer positioned over the object in the digital image. In various implementations, the act 1030 includes surfacing the preliminary object mask by generating a boarder for the object based on the preliminary object mask, highlighting the object by modifying the pixels of the digital image corresponding to the object based on the preliminary object mask, or applying a filter to the pixels of the digital image corresponding to the object based on the preliminary object mask.

As shown, the series of acts 1000 also includes an act 1040 of detecting a second user input indicating a second object of the plurality of objects. For instance, the act 1040 involves detecting the second user input via the graphical user interface. In one or more implementations, the act 1040 includes detecting a hovering pointer over the second object or a touch tap gesture on the second object.

As shown, the series of acts 1000 also includes an act 1050 of ceasing to display the preliminary object mask for the first object. For instance, the act 1050 involves ceasing to display the preliminary object mask for the first object in response to detecting the to the second user input indicating the second object or that the first user input has changed to the second user input. In one or more implementations, the act 1050 includes detecting a hovering pointer over the second object or a touch tap gesture on the second object.

As shown, the series of acts 1000 also includes an act 1060 of displaying a preliminary object mask for the second object via the graphical user interface. For instance, the act 1060 involves displaying a preliminary object mask for the second object via the graphical user interface in response to detecting the to the second user input indicating the second object or that the first user input has changed to the second user input. In one or more implementations, the act 1060 includes displaying a preliminary object mask for the second object previous generated when the first preliminary object mask was generated and before receiving or detecting the second user input indicating the second object.

The series of acts 1000 optionally include additional acts. For example, in one or more implementations, the series of acts 1000 includes the acts of detecting an additional user input and displaying the preliminary object masks for the plurality of objects simultaneously in response to the additional user input. In various implementations, the series of acts 1000 includes the acts of receiving user input to select the second object while the preliminary object mask for the first object is displayed; merging the preliminary object mask for the first object and the preliminary object mask for the second object into a merged preliminary object mask; and displaying the merged preliminary object mask via the graphical user interface.

In additional implementations, the series of acts 1000 includes the act of receiving a user selection of the preliminary object mask for the second object. Further, in some implementations, the series of acts 1000 includes the act of generating a refined object mask for the second object in response to the user selection of the preliminary object mask for the second object. Wherein generating the refined object mask for the second object comprises generating an object mask that has a higher resolution than the preliminary object mask for the second object. In such implementations, the series of acts 1000 includes displaying the refined object mask for the second object via the graphical user interface.

Turning to FIG. 11, FIG. 11 shows a flowchart of a series of acts 1100 of generating preliminary object masks and on-demand refined object masks in accordance with one or more implementations. In various implementations, the series of acts 1100 is implemented on one or more computing devices, such as the client device 112 or the server(s) 102. In addition, in some implementations, the series of acts 1100 is implemented in a digital environment for creating or editing digital content (e.g., digital images). For example, the series of acts 1100 is implemented on one or more computing devices (e.g., server devices) having memory (or memory devices) that includes objects within a plurality of digital images.

The series of acts 1100 includes an act 1110 of generating preliminary object masks for one or more objects in a digital image. For instance, the act 1110 includes receiving a digital image including a plurality of objects. In one or more implementations, the act 1110 includes providing the digital image for display within an image editing application. Act 1110 involves generating the preliminary object masks utilizing a panoptic segmentation neural network on a computing device. Act 1110 also involves detecting objects in the digital image utilizing one or more detection heads of the panoptic segmentation neural network. Act 1110 also involves generating, utilizing a masking head of the panoptic segmentation neural network, a preliminary object mask for each object detected in the digital image. Act 1110 also optionally involves generating initial object masks for the one or more objects utilizing the panoptic segmentation neural network and refining the initial object masks to generate the preliminary object masks utilizing a segmentation refinement neural network. In one or more implementations act 1110 also involves generating preliminary object masks having a lower resolution than the digital image. Act 1110 optionally involves generating the preliminary object masks for the plurality of objects in response to selection of an option to mask all objects in the digital image without further user input.

As shown, the series of acts 1100 also includes an act 1120 of displaying the digital image via a graphical user interface. As shown, the series of acts 1100 also includes an act 1130 of receiving a first user input indicating an object of the one or more objects in the digital image. For instance, the act 1130 involves detecting the first user input. In example implementations, the act 1130 detecting a hovering pointer over the object or a touch tap gesture on the object.

As shown in FIG. 11, the series of acts 1100 further includes an act 1140 of displaying a preliminary object mask for the object. For instance, the act 1140 includes displaying, in response to the first user input, a preliminary object mask for the object via the graphical user interface. In some implementations, the act 1140 includes displaying the preliminary object mask in a layer positioned over the object in the digital image. In various implementations, the act 1140 includes surfacing the preliminary object mask by generating a boarder for the object based on the preliminary object mask, highlighting the object by modifying the pixels of the digital image corresponding to the object based on the preliminary object mask, or applying a filter to the pixels of the digital image corresponding to the object based on the preliminary object mask.

As shown, the series of acts 1100 also includes an act 1150 receiving a second user input selecting the preliminary object mask. In some implementations, the act 1150 comprises detecting a click or tap on the preliminary object mask.

As shown, the series of acts 1100 also includes an act 1160 generating a refined object mask for the object. In one or more implementations, act 1160 involves generating the refined object mask for the object in response to the second user input selecting the preliminary object mask. In other words, act 1160 is performed on-demand to user input. In one or more implementations act 1160 involves generating the refined object mask for the object by refining and upscaling the preliminary object mask utilizing a segmentation refinement neural network remote from the computing device. For example, act 1160 can involve generating a revised preliminary object mask utilizing an object selection model and refining and upscaling the revised preliminary object mask utilizing the segmentation refinement neural network. Additionally generating the refined object mask for the object comprises generating an object mask that has a higher resolution than the preliminary object mask. In such implementations, the series of acts 1100 includes displaying the refined object mask via the graphical user interface.

In additional implementations, the series of acts 1100 includes the act of receiving a selection to generate refined masks for all objects in the digital image. Further, in some implementations, the series of acts 1100 includes the act of generating refined object masks for the one or more objects from the preliminary object masks for the one or more objects.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the object segmentation system to automatically select objects and partial objects on digital images as described herein.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 12:
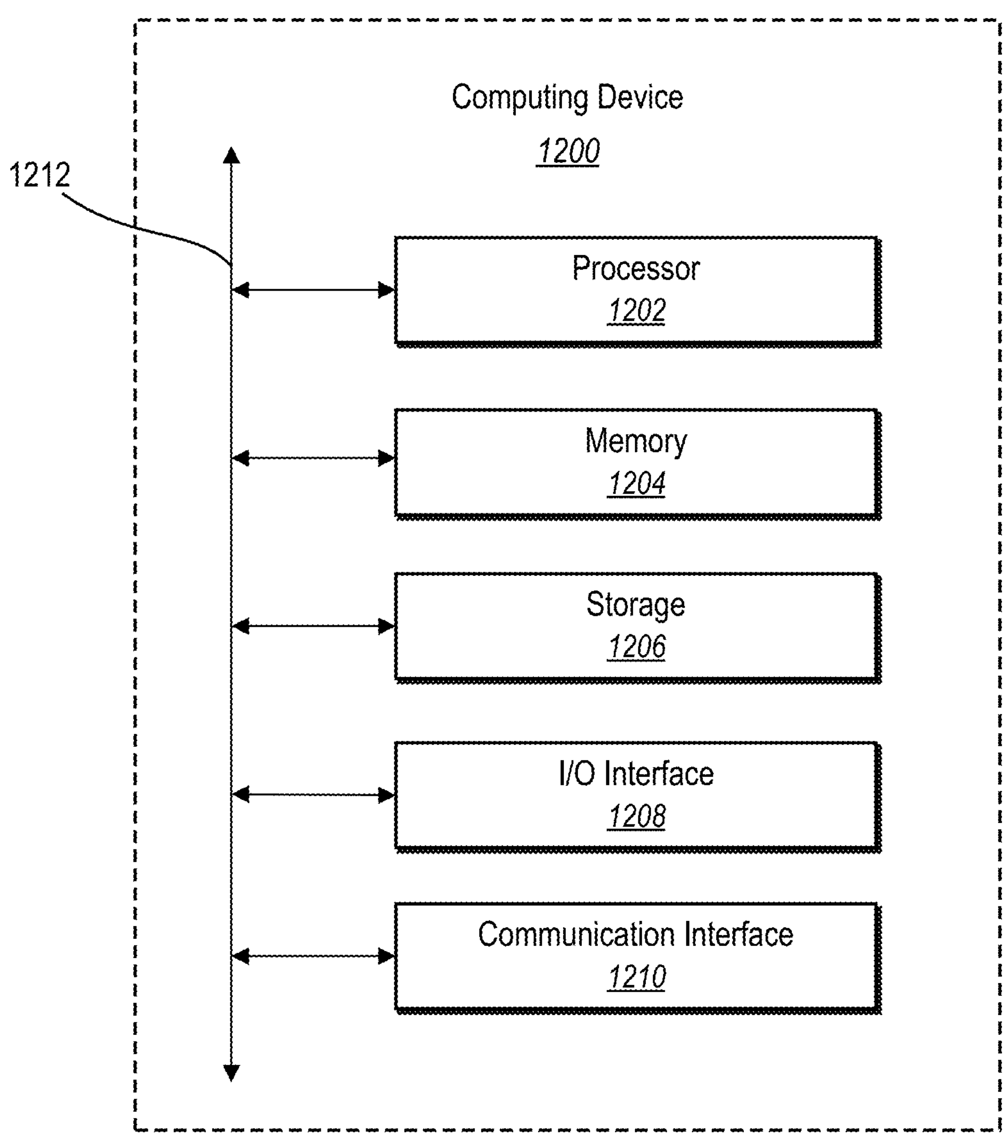
FIG. 12 illustrates a block diagram of an exemplary computing device in accordance with one or more implementations.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102 and/or the client devices 110*a*-110*n*). In one or more implementations, the computing device 1200 may be a mobile device (e.g., a mobile telephone, a smartphone, a PDA, a tablet, a laptop, a camera, a tracker, a watch, a wearable device). In some implementations, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, jointly utilizing a first neural network and in response to receiving a digital image, preliminary object masks for a plurality of objects in the digital image, wherein each preliminary object mask corresponds to an object of the plurality of objects in the digital image;

receiving, via a graphical user interface, a first user input indicating a first object of the plurality of objects in the digital image;

displaying, in response to the first user input, a first preliminary object mask for the first object via the graphical user interface, the first preliminary object mask having a first resolution;

receiving, via the graphical user interface, a second user input indicating a second object of the plurality of objects in the digital image;

displaying, in response to the second user input, a second preliminary object mask for the second object via the graphical user interface, the second preliminary object mask having the first resolution, while also removing display of the first preliminary object mask;

detecting, via the graphical user interface, a third user input selecting the displayed second preliminary object mask for the second object via the graphical user interface; and in response to the third user input selecting the second preliminary object mask for the second object, generating a refined object mask for the second object utilizing a second neural network that requires longer processing time than the first neural network, the refined object mask having a second resolution that is greater than the first resolution.

2. The computer-implemented method of claim 1, further comprising detecting the first user input by detecting a hovering pointer over the first object or a touch tap gesture on the first object.

3. The computer-implemented method of claim 1, wherein generating the preliminary object masks for the plurality of objects comprises generating preliminary object masks having a lower resolution than the digital image.

4. The computer-implemented method of claim 1, further comprising:

detecting an additional user input; and displaying the preliminary object masks for the plurality of objects simultaneously in response to the additional user input.

5. The computer-implemented method of claim 1, wherein generating the preliminary object masks for the plurality of objects further comprises generating the preliminary object masks for the plurality of objects in response to selection of an option to mask all objects in the digital image without further user input.

6. The computer-implemented method of claim 1, further comprising:

while the first preliminary object mask for the first object is displayed, receiving user input to select the second object;

merging the first preliminary object mask for the first object and the second preliminary object mask for the second object into a merged preliminary object mask; and displaying the merged preliminary object mask via the graphical user interface.

7. The computer-implemented method of claim 1, further comprising:

receiving a user selection of a third preliminary object mask for a third object;

in response to the user selection of the third preliminary object mask for the third object, generating a refined object mask for the third object, wherein the refined object mask for the second object has a higher resolution than the third preliminary object mask for the third object; and displaying the refined object mask for the third object via the graphical user interface.

8. A non-transitory computer readable medium comprising instructions that, when executed by at least one processor, cause a computing device to perform operations comprising:

generating, jointly utilizing a first neural network and in response to receiving a digital image, preliminary object masks for one or more objects in the digital image, wherein each preliminary object mask corresponds to an object of the one or more objects in the digital image;

displaying the digital image via a graphical user interface;

detecting, via the graphical user interface, a first user input indicating first object of the one or more objects;

in response to the first user input, displaying via the graphical user interface a first preliminary object mask for the first object, the first preliminary object mask having a first resolution;

receiving, via the graphical user interface, a second user input indicating a second object of the one or more objects in the digital image;

displaying, in response to the second user input, a second preliminary object mask for the second object via the graphical user interface, the second preliminary object mask having the first resolution, while also removing display of the first preliminary object mask;

detecting, via the graphical user interface, a third user input selecting the displayed second preliminary object mask for the second object via the graphical user interface; and in response to the third user input selecting the second preliminary object mask for the second object, generating a refined object mask for the second object utilizing a second neural network that requires longer processing time than the first neural network, the refined object mask having a second resolution that is greater than the first resolution.

9. The non-transitory computer readable medium of claim 8, wherein detecting, via the graphical user interface, the first user input indicating the first object comprises detecting that a cursor is hovering over the object.

10. The non-transitory computer readable medium of claim 9, wherein detecting, via the graphical user interface, the third user input selecting the second preliminary object mask for the second object comprises detecting a click or tap on the second preliminary object mask.

11. The non-transitory computer readable medium of claim 8, wherein generating the refined object mask for the second object comprises refining and upscaling the second preliminary object mask utilizing a segmentation refinement neural network remote from the computing device.

12. The non-transitory computer readable medium of claim 11, wherein generating the refined object mask for the second object comprises:

generating a revised preliminary object mask utilizing an object selection model; and refining and upscaling the revised preliminary object mask utilizing the segmentation refinement neural network.

13. The non-transitory computer readable medium of claim 11, wherein generating preliminary object masks for the one or more objects comprises generating the preliminary object masks utilizing a panoptic segmentation neural network on the computing device.

14. The non-transitory computer readable medium of claim 13, wherein generating the preliminary object masks utilizing the panoptic segmentation neural network comprises:

detecting objects in the digital image utilizing one or more detection heads of the panoptic segmentation neural network; and for each object detected in the digital image, generating, utilizing a masking head of the panoptic segmentation neural network, a preliminary object mask.

15. The non-transitory computer readable medium of claim 8, wherein generating preliminary object masks for the one or more objects comprises:

generating initial object masks for the one or more objects; and refining the initial object masks to generate the preliminary object masks utilizing a segmentation refinement neural network.

16. The non-transitory computer readable medium of claim 8, further comprising instructions that when executed by the at least one processor cause the computing device to perform further operations comprising:

receiving a selection to generate refined masks for all objects in the digital image; and generating refined object masks for the one or more objects from the preliminary object masks for the one or more objects.

17. A system comprising:

one or more memory devices storing a panoptic segmentation neural network and a segmentation refinement neural network; and at least one processor configured to cause the system to:

generate, in response to receiving a digital image, preliminary object masks for objects in the digital image utilizing the panoptic segmentation neural network, wherein each preliminary object mask corresponds to an object of the objects in the digital image;

display the digital image via a graphical user interface;

in response to a first user input indicating first object of the objects in the digital image, display a first preliminary object mask for the first object via the graphical user interface, the first preliminary object mask having a first resolution;

in response to a second user input indicating a second object of the objects in the digital image, display a second preliminary object mask for the second object via the graphical user interface, the second preliminary object mask having the first resolution, while also removing display of the first preliminary object mask; and in response to a third user input selecting the displayed second preliminary object mask for the second object, generate a refined object mask for the second object utilizing the segmentation refinement neural network that requires longer processing time than the panoptic segmentation neural network, the refined object mask having a second resolution that is greater than the first resolution.

18. The system as recited in claim 17, wherein the at least one processor is configured to cause the system to generate the preliminary object masks by generating object masks having the first resolution.

19. The system as recited in claim 18, wherein the at least one processor is configured to cause the system to generate the refined object mask for the second object by refining and upscaling the second preliminary object mask for the second object to the second resolution.

20. The system as recited in claim 17, wherein the at least one processor is configured to cause the system to generate the preliminary object masks for the objects in the digital image in response to a single user input.

* * * * *